(12) United States Patent
Schauer et al.

(10) Patent No.: US 11,845,202 B2
(45) Date of Patent: Dec. 19, 2023

(54) NEAR-FIELD MICROWAVE HEATING SYSTEM AND METHOD

(71) Applicants: Robert J. Schauer, Durham, NC (US); Keith R. Hicks, Garner, NC (US); Andrew Cardin, Cary, NC (US); Clayton R. DeCamillis, Raleigh, NC (US); Yunchuan Liu, Oxford (GB); Andrew Bools, Leicester (GB)

(72) Inventors: Robert J. Schauer, Durham, NC (US); Keith R. Hicks, Garner, NC (US); Andrew Cardin, Cary, NC (US); Clayton R. DeCamillis, Raleigh, NC (US); Yunchuan Liu, Oxford (GB); Andrew Bools, Leicester (GB)

(73) Assignee: Expert Tooling and Automation, LTD, Coventry (GB)

( * ) Notice: Subject to any disclaimer, the term of this patent is extended or adjusted under 35 U.S.C. 154(b) by 402 days.

(21) Appl. No.: 17/178,219

(22) Filed: Feb. 17, 2021

(65) Prior Publication Data

US 2022/0258384 A1    Aug. 18, 2022

(51) Int. Cl.
*H05B 6/70* (2006.01)
*H05B 6/64* (2006.01)
*B29C 35/08* (2006.01)
*H05B 6/80* (2006.01)

(52) U.S. Cl.
CPC ......... *B29C 35/0805* (2013.01); *H05B 6/707* (2013.01); *H05B 6/80* (2013.01); *B29C 2035/0855* (2013.01)

(58) Field of Classification Search
CPC ........ B29C 35/0805; B29C 2035/0855; B29C 65/1487; B29C 65/4835; B29C 65/1425; B29C 65/7841; B29C 66/1122; B29C 66/21; B29C 66/7212; B29C 66/742; B29C 66/83413; B29C 66/845; B29C 66/863; H05B 6/707; H05B 6/80; B29L 2031/30; B29L 2031/26; B29L 2031/724; B60K 15/035; F02M 37/0023; F02M 37/007;

(Continued)

(56) References Cited

U.S. PATENT DOCUMENTS 3,221,132 A    7/1963   Staats
4,420,492 A   12/1983   Taylor (Continued)

FOREIGN PATENT DOCUMENTS

JP    2000156587 A   *   6/2000

*Primary Examiner* — Quang T Van
(74) *Attorney, Agent, or Firm* — Robert J. Lauf

(57) ABSTRACT

A microwave heating system includes: a variable-frequency microwave source having a usable bandwidth about a center frequency; a waveguide with an input side connected to the source and an output side terminating in a launch structure; and, a metallic reflector plate facing the launch structure and perpendicular thereto and spaced therefrom at a distance of no more than twice the microwave wavelength at an operative frequency of the microwave source, the reflector plate including a recessed area of a selected size and shape located facing the launch structure so that a material to be treated may be placed between the launch structure and the recessed area for exposure to microwave energy. A related method is also disclosed.

20 Claims, 19 Drawing Sheets

(58) Field of Classification Search
CPC . F02M 37/20; F16K 17/366; Y10T 137/0874; B29K 2307/04; B29K 2309/08
USPC ....... 219/690, 686, 709, 716, 717, 745, 761, 219/757
See application file for complete search history.

(56) References Cited

U.S. PATENT DOCUMENTS

| | | | |
|---|---|---|---|
| 5,786,877 | A * | 7/1998 | Yamada ............ G02F 1/133308 349/150 |
| 6,191,402 | B1 | 2/2001 | Ekemar |
| 10,710,313 | B2 | 7/2020 | Ahmad et al. |
| 2003/0094240 | A1 * | 5/2003 | Sarmiento ........... B29C 66/1222 156/380.9 |
| 2005/0011885 | A1 | 1/2005 | Seghatol |
| 2009/0221999 | A1 | 9/2009 | Shahidi |
| 2009/0321432 | A1 * | 12/2009 | Han ...................... H05B 6/806 219/761 |
| 2010/0170016 | A1 | 7/2010 | Schilling |
| 2011/0193566 | A1 | 8/2011 | Nyshadham |
| 2011/0303824 | A1 | 8/2011 | Grbic |
| 2011/0301588 | A1 | 12/2011 | Cronin |
| 2013/0150844 | A1 | 6/2013 | Deem |
| 2015/0313273 | A1 | 11/2015 | Stromotich |
| 2018/0257308 | A1 * | 9/2018 | Ahmad ................... B29C 73/34 |

* cited by examiner

SECTION A-A

NEAR-FIELD MICROWAVE HEATING SYSTEM AND METHOD

BACKGROUND OF THE INVENTION

Field of the Invention

The invention pertains to apparatus and methods for heating materials with microwaves, and more particularly to spot-curing thermosetting materials using a near-field microwave applicator.

Description of Related Art

Microwave heating systems generally rely on a waveguide launcher that introduces microwave energy into an enclosed volume, referred to as a cavity. The cavity is typically metal, and the cavity walls enclose and define a volume of space in which microwave fields are established. The cavity may be tuned to support a single resonant mode, in which case it is typically cylindrical. Alternatively, the cavity may be multimode, in which many standing waves are established within the boundary conditions controlled by the size of the cavity, the load, and the wavelength of the microwaves. In either case, care is conventionally taken to place the load or workpiece well away from the near-field region directly adjacent to the waveguide or launcher.

Avoiding the near-field region is done for several reasons:
1. The workpiece is generally larger than the near-field region, so placing the part too close to the launcher will greatly increase the non-uniformity of heating.
2. Modeling the electric field distribution in a large multimode cavity is relatively straightforward for the far field case, whereas modeling in the near-field region is very difficult.

In variable-frequency microwave (VFM) heating systems, frequency sweeping is used to maintain a constantly-shifting pattern of standing waves in a multimode cavity, whereby an extremely uniform time-averaged power density is established throughout the working volume of the cavity. In conventional VFM systems, the multimode cavity is significantly larger than one wavelength in all three dimensions to allow for the establishment of many superimposed modes, as explained in detail in U.S. Pat. No. 5,961,871 to Bible et al. However, even in this case, the workpiece cannot be placed in the near-field region where the incoming power density is extremely high because it will prevent the microwave energy from fanning out and establishing the multitude of modes responsible for creating a uniform environment in most of the cavity.

The use of localized or near-field microwave heating has been suggested for a number of applications, such as localized tissue ablation for medical treatment, processing of foods, drying, and other purposes.

US 2015/0313273 to Stromotich et al. teaches a drying apparatus in which material to be dried is conveyed through an elongated cavity. Slotted waveguides extend into the cavity in the direction normal to the conveyor, and microwave energy emerging from the slots in the waveguides is applied to the material in the near field range of the slots.

US 2013/0150844 to Deem et al. discloses a hand-held device for locally treating living tissue by microwave heating. Cooling means are provided so that heating affects underlying tissues without burning the skin of the patient.

US 2011/0301588 to Cronin discloses an elongated microwave radiator with a monopole antenna at the tip, for insertion into a living body.

US 2009/0221999 to Shahidi discloses a handheld device for locally heating tissue, using a probe comprising a plurality of antennas, configured so that, by modifying the frequency or phase of individual antennas relative to one another, near-field interference effects can be used to tailor the pattern of the applied power density.

US 2005/0011885 to Seghatol et al. discloses a hand-held dental tool having a small antenna at its distal end to supply microwave power, taught to be generally less than 10 W at a preferred frequency from about 14 to 24 GHz, to cure dental resin for various restorative procedures.

U.S. Pat. No. 4,420,492 to Taylor discloses a method for shucking oysters by selectively heating the adductor muscle with microwaves. Microwaves are applied either by a small loop antenna or by an inwardly-tapering waveguide that concentrates the energy in a small region so as to heat the adductor muscle without cooking the rest of the contents of the oyster.

U.S. Pat. No. 6,191,402 to Ekemar discloses an RF heating system (50 kHz-299 MHz) in which a load to be heated is placed proximate to a generally planar antenna, disposed within a metal cavity. Ekemar teaches that frequencies below about 300 MHz provide advantages over microwaves, particularly in the depth of penetration into the material being heated. Ekemar further states that, "Favorable heating will be obtained if the cavity space is delimited. The cubic root of the cavity space volume shall not exceed 25% of any wavelength in vacuum conditioned by applied frequency . . . "

The use of carbon fiber composites (CFC) and glass fiber composites (GFC) to reduce weight in autos and trucks is driven by requirements for lower emissions and higher fuel economy. A major problem in use of carbon fiber composites for various components in an automotive assembly line is that conventional fasteners and tack welding cannot be used, so adhesive bond joints are typically used to join CFC and GFC components to composite or metal components. However, the time to cure the adhesive joint can be 15-20 minutes, which is not compatible the pace of automotive assembly line production.

US 2018/0257308 to Ahmad discloses a near-field microwave applicator in which a horn is brought into contact with a workpiece in order to locally cure a thermosetting adhesive or for other purposes.

It is known that microwave heating can cure adhesives as much as ten times faster than convection oven or hot air heating. A microwave oven is not practical because of the size and the fact that conventional microwave energy is not uniform and will arc with metals and with carbon fibers in CFCs. What is needed, therefore, is a way to adhesively bond components within the time constraints of a typical automotive manufacturing environment so as to secure each assembly well enough to allow continued movement of the assembly down the production line.

Many automotive components are irregular sizes and shapes, so that spot curing using a rectangular feed horn in direct contact with the workpiece as taught by Ahmad in US 2018/0257308 may be inconvenient in many situations

OBJECTS AND ADVANTAGES

Objects of the present invention include the following: providing an apparatus for applying microwave power over a localized area while maintaining substantially near-field conditions; providing an apparatus for microwave-heated tack-bonding of polymer materials in a production line environment; providing an apparatus for localized microwave heating using a VFM source and a near-field applicator; providing an apparatus for curing adhesives and polymers over a localized area using a near-field applicator as a preliminary step to further curing of the same material over a more extended area; providing an improved method for composite bonding and field repairs; and providing fixturing methods for the safe application of microwave power to a selected surface area, which may be substantially flat or may have some degree of curvature. These and other objects and advantages of the invention will become apparent from consideration of the following specification, read in conjunction with the drawings.

SUMMARY OF THE INVENTION

According to one aspect of the invention, a microwave heating system comprises:
- a variable-frequency microwave source;
- a waveguide with an input side connected to the source and an output side terminating in a launch structure; and,
- a fixture positioned to hold a selected workpiece containing a curable adhesive material to be treated proximate to the launch structure so that a small portion of the material to be treated lies in the near field region of the launch structure, wherein:
  - said fixture comprises a metallic plate disposed on the side of said workpiece opposite said launch structure, and said metallic plate includes a recessed area of a selected size and shape located opposite said launch structure.

According to another aspect of the invention, a microwave heating system comprises:
- a variable-frequency microwave source having a selected bandwidth about a center frequency;
- a waveguide with an input side connected to said source and an output side terminating in a launch structure; and,
- a metallic reflector plate facing said launch structure and perpendicular thereto and spaced therefrom at a distance of no more than twice the microwave wavelength at an operative frequency of said source, said reflector plate including a recessed area of a selected size and shape located facing said launch structure so that a material to be treated may be placed between said launch structure and said recessed area for exposure to microwave energy.

According to another aspect of the invention, a microwave applicator comprises:
- a waveguide capable of transmitting microwave power in a traveling wave mode with an input side for connection to a microwave source and an output side terminating in a launch structure; and,
- a metallic reflector plate facing said launch structure and perpendicular thereto and spaced therefrom at a distance of no more than twice the microwave wavelength at an operative frequency of said waveguide, said reflector plate including a recessed area of a selected size and shape located facing said launch structure so that a material to be treated may be placed between said launch structure and said reflector plate for localized exposure to microwave energy.

According to another aspect of the invention, a method for microwave curing comprises the steps of:
- providing a variable-frequency microwave source;
- providing a waveguide with an input side connected to the source and an output side terminating in a launch structure;
- applying an adhesive bonding material over an extended contact area between two components forming an assembly to be bonded, where the extended contact area is substantially larger than the area of the launch structure;
- positioning the launch structure on one side of the assembly to be bonded;
- positioning a reflector plate on the opposite side of the assembly to be bonded, the reflector plate having a recessed area of a selected size and shape located facing said launch structure; and,
- applying microwave energy via the launch structure so that a localized portion of the extended contact area between the launch structure and the recessed area is subjected to microwave energy in the near-field region of the launcher while the remaining portion of the extended contact area is not.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIGS. 6A-C illustrate some exemplary geometrical configurations of the recessed area on the backing plate. The pockets of different sizes and shapes may be used to optimize process variables for particular applications. FIG. 6A is a plan view of the plate. FIG. 6B is a section along B-B, and FIG. 6C is a section along A-A.

FIG. 7A presents a view of the overall configuration; FIG. 7B shows a closer view of the power supply, launcher, and backing plate.

FIG. 9A shows a plan view, and FIG. 9B shows a section along A-A.

DETAILED DESCRIPTION OF THE INVENTION

Generally, the invention employs a variable frequency microwave power supply, a waveguide launcher, and a fixture to support a material to be heated, with the fixture/workpiece located directly adjacent to the end of the launcher. All heating occurs in the near-field region, i.e., no cavity modes or standing waves are established within the fixture or the workpiece. This condition may be insured by keeping the thickness of the entire fixture under two wavelengths (at all microwave frequencies being used). This will mean that the workpiece lies within one wavelength of the launcher and also within one wavelength of the fixture/backwall. In most cases, Applicants prefer to keep the total distance between launcher and reflective backwall under one wavelength A previously-described near-field heating system (Ahmad et al, US 2018/0257308) is illustrated schematically in FIG. 1. The launcher is a rectangular horn 43' configured to apply the microwave power locally over a selected area while maintaining a single propagating mode; to this end, the horn may contain ridges compatible with a ridged waveguide and operative over the selected microwave frequency range. Here, the horn is shown pressing against a lap joint 53 between two components 51, 52 and straddling an area of the lap joint to be adhesively bonded. Additional structures 50, 63 may be provided to seal against microwave leakage during operation.

Figure 2:
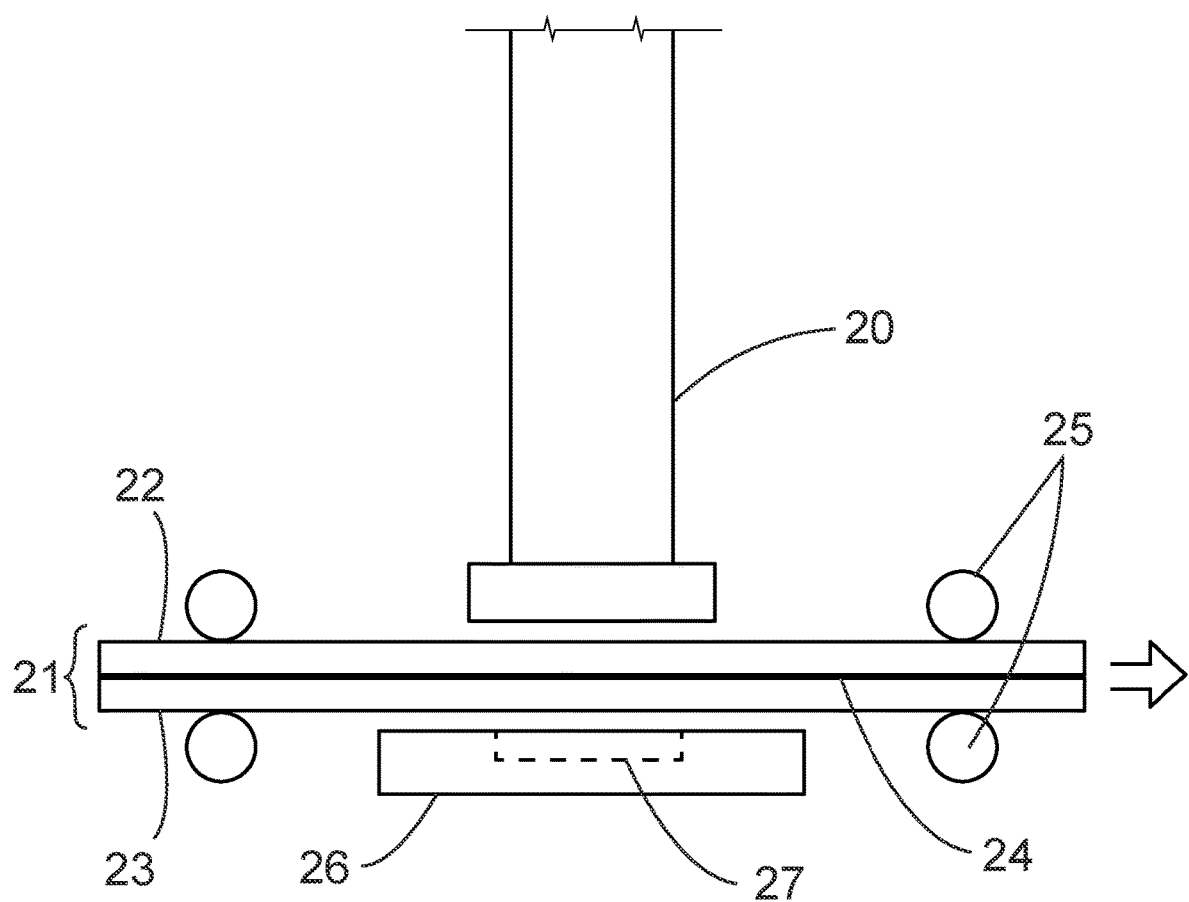
FIG. 2 illustrates a ridged waveguide microwave applicator in accordance with one aspect of the invention.

In the present invention, as shown schematically in FIG. 2, the launcher may be an open ridged waveguide 20 with or without a horn, and positioned at a selected distance above the workpiece.

The fixture may comprise a means for compressing or otherwise securing an article containing a polymer or adhesive to be cured. The article to be cured may include: polymer composites; carbon fiber composites; lap joints containing adhesive; lap joints in which one component is metallic; and composites having sections undergoing repair.

The fixture includes a metal back plate 26 on the opposite side of the workpiece from the launcher. The back plate further includes a pocket or recess 27 facing the workpiece and generally aligned with the center of the microwave launcher 20, as shown, e.g., in FIG. 2.

In electrical terms, prior art systems, whether fixed frequency or VFM, involve a cavity in which one or many modes are established, and the workpiece comprises a load, which is limited to some fraction of the total volume of the cavity and kept out of the near-field region so that well established cavity physics applies. The Q factor of the loaded cavity can, at least in principle, be calculated. Stub tuners or other devices may be placed in the waveguide to improve coupling to the cavity and reduce reflected power. Note that Applicants use the term "cavity" in the sense that is well understood within the microwave heating industry. As defined by Wikipedia, "A microwave cavity or radio frequency (RF) cavity is a special type of resonator, consisting of a closed (or largely closed) metal structure that confines electromagnetic fields in the microwave region of the spectrum. The structure is either hollow or filled with dielectric material. The microwaves bounce back and forth between the walls of the cavity. At the cavity's resonant frequencies they reinforce to form standing waves in the cavity."

The invention, by contrast, comprises a waveguide terminating adjacent to the workpiece. There is, effectively, no cavity per se and the entire volume of the workpiece to be treated lies within the near-field region. Cavity physics does not apply because standing waves cannot be formed when the thickness of the fixture is less than half the wavelength. (Dimensions of the fixture and workpiece may be more than one wavelength in the two other directions, however, as Applicants postulate the open waveguide launcher, placed close to the workpiece, effectively prevents the establishment of modes or standing waves in those directions.) The electrical circuit effectively created is instead analogous to a waveguide that simply terminates in a dummy load rather than either a cavity or free space.

In many contemplated applications, the workpiece is a relatively thin polymer or polymer composite. "Thin", in this context, means that the thickness of the workpiece is less than the skin depth at the microwave frequencies being used. Thus, a significant amount of microwave power will pass completely through the workpiece and be reflected off the backing plate and back into the workpiece. Applicants have discovered that microwave heating can be dramatically enhanced by creating a small recess or pocket in the surface of the metal back wall, as will be further described in the examples to follow.

Figure 1:
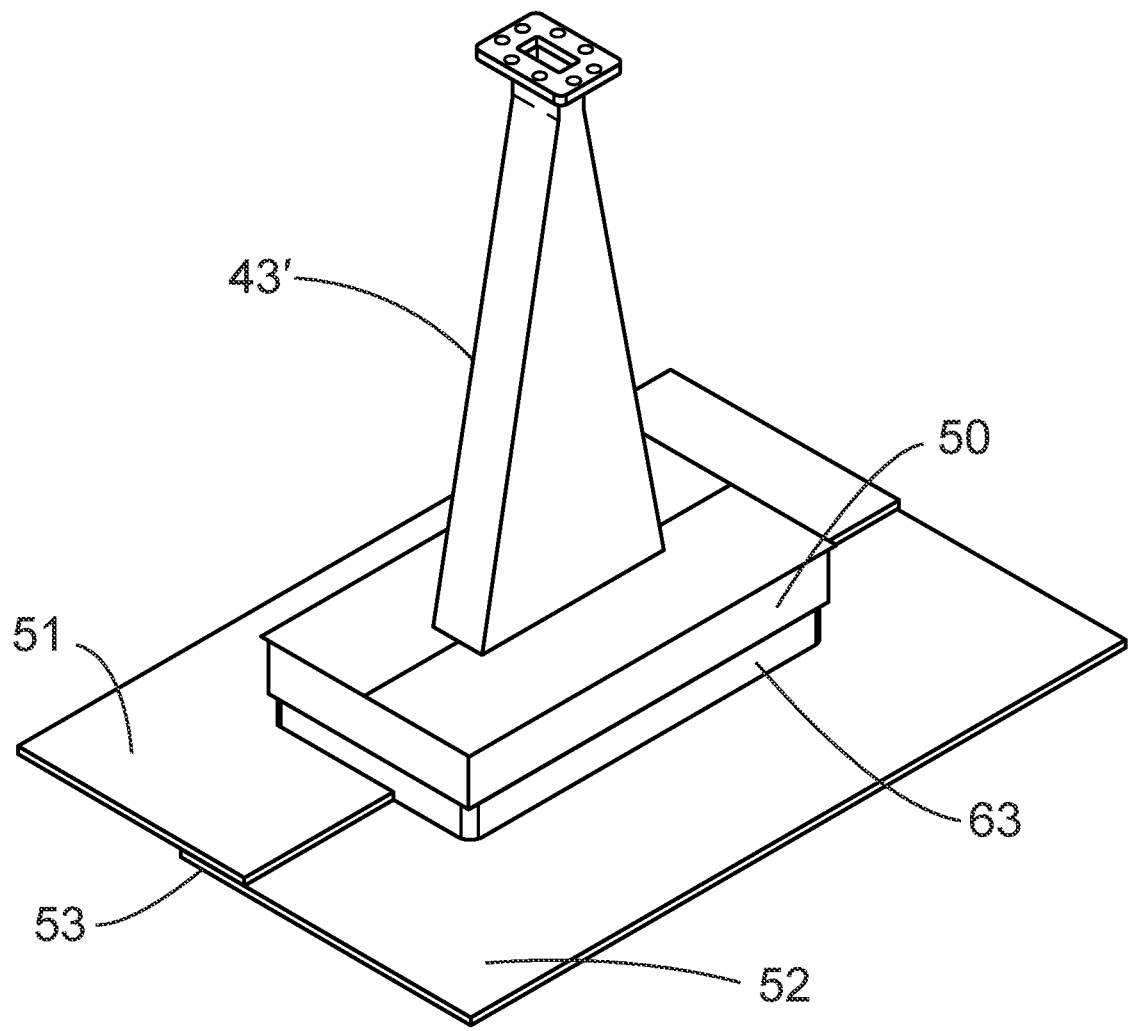
FIG. 1 illustrates a Prior Art near-field microwave applicator as taught by Ahmad in US 2018/0257308.

Prior art VFM cavity systems rely on the combination of frequency sweeping and standard cavity physics to establish a generally uniform time-averaged power density in the far-field part of the cavity (generally a few wavelengths away from the launch structure). Prior art VFM near-field systems rely in an applicator (typically a horn structure) placed directly on a workpiece to establish localized microwave heating (FIG. 1).

The invention, by contrast, contains only the near-field region in front of an open launcher spaced at a distance above the surface of the workpiece, does not establish standing waves in a cavity, and uses frequency variation for a completely different function, viz., to better penetrate carbon-fiber composites and speed chemical reactions in polymers and adhesives while avoiding arcing around metal components.

Several of the specific examples that follow describe particular systems and designs intended for use with a C band microwave source (5.85 to 8.20 GHz). It will be understood that these descriptions are exemplary in nature and Applicants do not intend for the invention to be limited to C band or to any particular bandwidth or sweep rate. The skilled artisan may easily modify the invention to operate at other frequencies by following well-known engineering design and modeling principles. In particular, variable frequency microwave sources employing traveling wave tube amplifiers, solid state power amplifiers, tunable magnetrons, etc., may be constructed to operate at a selected microwave frequency range of as much as an octave or more, or in a narrower band of, e.g., ±10%, ±5%, or ±1% around a selected center frequency. Exemplary microwave sources include the MG5349M tunable S-band magnetron [E2V Technologies Ltd., Chelmsford, England] having a frequency range of 2992 to 3001 MHz; the model K3C C-band compact klystron high power amplifier [CPI Satcom Division, Palo Alto, CA] having a frequency range of 5.850 to 6.425 GHz and instantaneous bandwidth of as much as 80 MHz; and the S5CI rack-mount SSPA [CPI Satcom Division, Palo Alto, CA] having a frequency range of 5.850 to 6.425 (optionally to 6.725) GHz. Frequency may be swept in a fairly continuous fashion through the operative bandwidth, swept in a series of discrete steps within the bandwidth, or hopped systematically or randomly from one frequency to another within the operative bandwidth depending on the needs of a particular process. Power may be held relatively constant or it may be varied during the process, either following a preset recipe or profile, or under active feedback control involving a process monitor.

EXAMPLE

A system was designed to operate on C band, using a 2.0-8.0 GHz, 500 W S/C band rack-mount TWTA [Model VZS/C-2780C2; Communications and Power Industries Canada, Inc., Georgetown, Ontario]. High power output was delivered to the microwave launcher through a standard WR137 ridged waveguide.

Those skilled in the art will realize that the aforementioned power supply has a very wide frequency range (2 octaves), and it will therefore be appreciated that other waveguides (e.g., WR430, WR340, WR284, WR187, etc.) may be suitable for particular frequency ranges.

The inventive near-field applicator has applications in joining and repair operations in which a polymer is to be cured quickly. Examples include adhesive bonding (metal-to-metal, metal-to-polymer, or polymer-to-polymer), repair of polymer-matrix composites (fiberglass or carbon fiber reinforced); spot-curing of thermosetting patches and fillers; localized heating of thermoplastics for bonding or other purposes; and localized curing to tack an assembly together before moving it to a larger oven to do the final curing.

Exemplary thermosetting polymers include: epoxies, phenolics, polyesters, silicones, vulcanized rubbers, methacrylates, and methyl methacrylates. It will be appreciated that some thermosets will cure slowly at temperatures as low as ambient (~20° C.) but in a production environment the cure temperature might range from about 80-150° C. to speed the curing.

Exemplary thermoplastic polymers include: polyethylene, polypropylene, polybutylene, polyimides, and polyamides.

Composite to composite experiments have been performed with a near field VFM applicator consisting of a straight waveguide with no rectangular horn on the opening. The waveguide was placed adjacent to but spaced a selected distance above the composite, with the aim of locally curing a small spot in the underlying adhesive layer. No damage to the carbon fiber composite was observed and the results demonstrate that VFM confers favorable process characteristics even in the absence of a traditional multimode cavity environment and without a feed horn in contact with the workpiece.

EXAMPLE

Figure 7A:
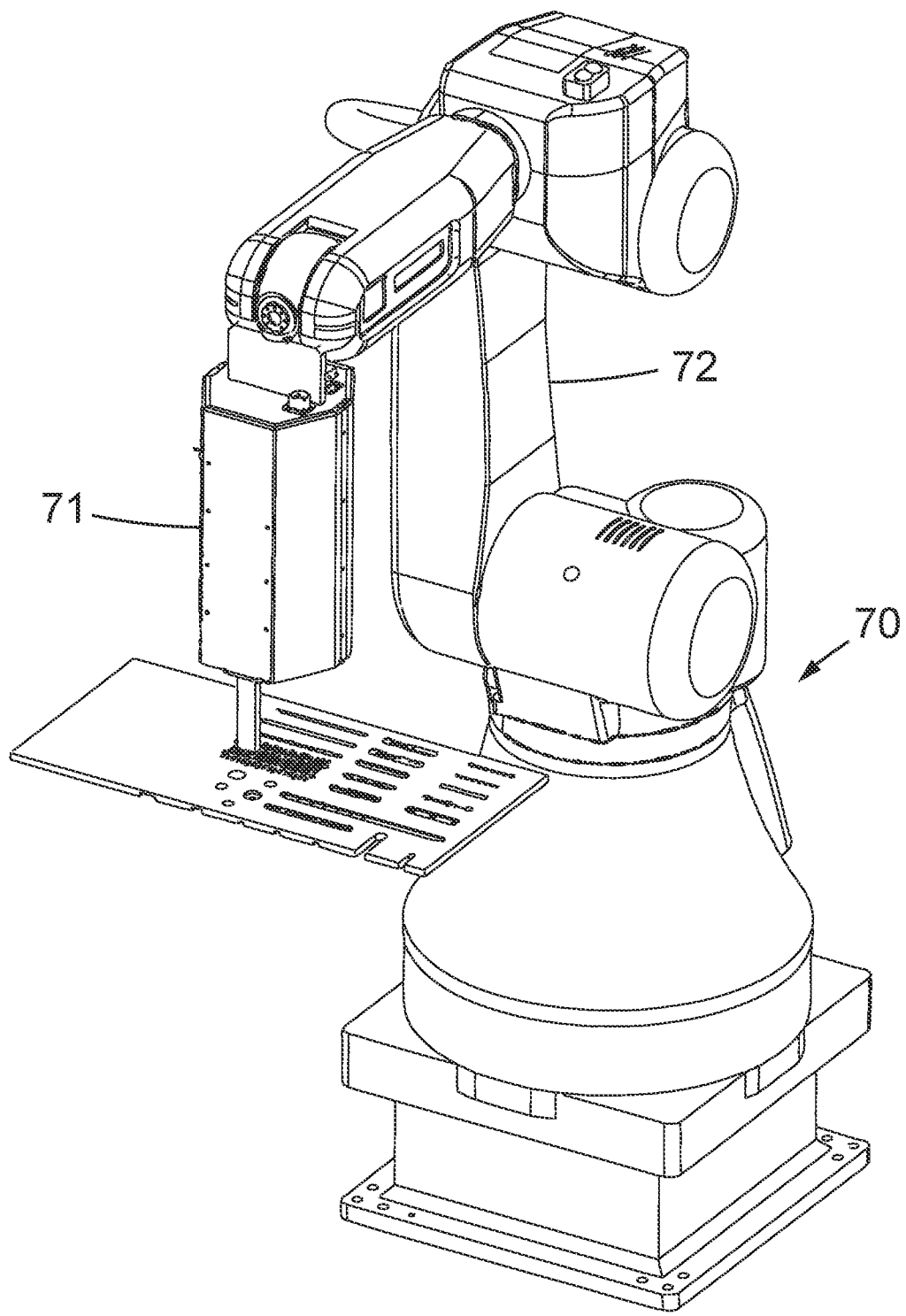
FIGS. 7A-B illustrate another example of the invention, in which an industrial robot supports a microwave power supply with a waveguide launcher positioned at a selected distance above a backing plate having pockets of various geometries formed in the facing surface. A workpiece would be positioned between the launcher and the backing plate, and the robot arm can move the launcher into position over the workpiece and opposite a particular pocket.
Figure 7B:
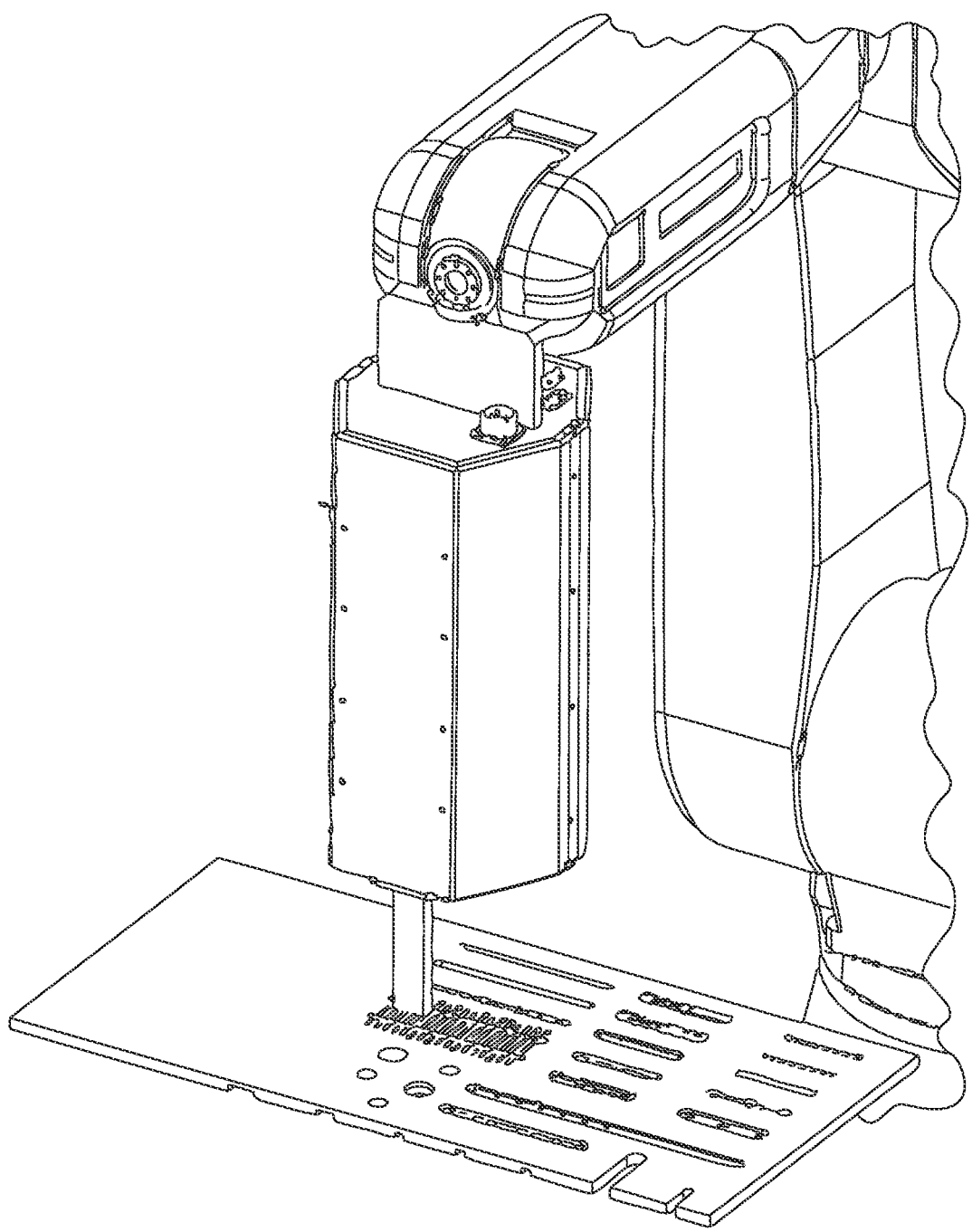
Figure 8:
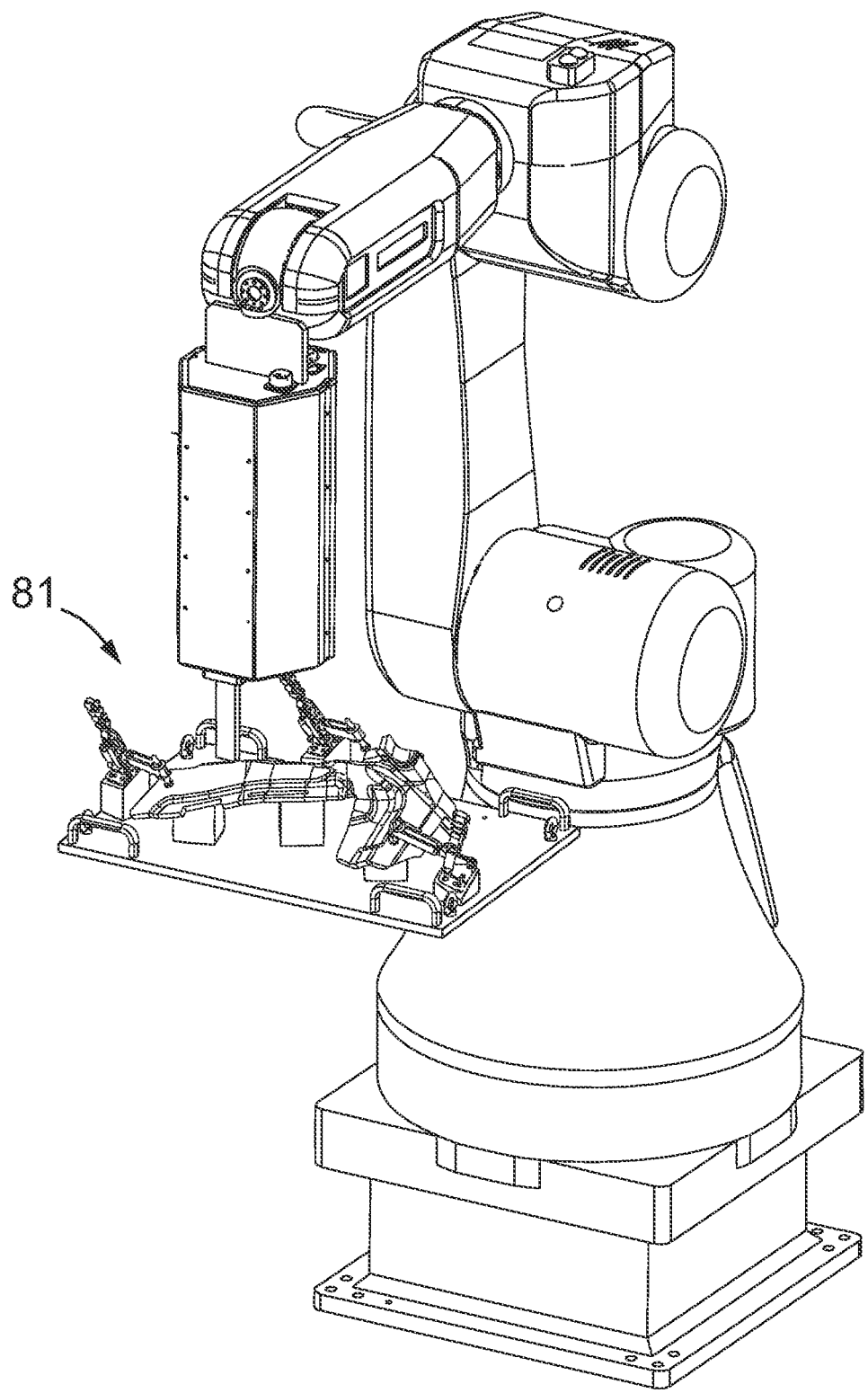
FIG. 8 illustrates an example of a near-field applicator in which a customized fixture holds a component in place on top of a backing plate that has pocket features placed at selected spots for that particular component. The robot moves the microwave launcher from one selected spot to another to locally spot cure an adhesive bond, using the underlying pocket features to facilitate rapid curing.

Automobile assembly typically involves a high degree of automation, with large robots capable of holding robust tooling to perform welds or other operations on chassis and body components held in customized fixtures. FIGS. 7-8 show a conventional factory robot 70 [Model IRB 7600, ABB Robotics, Affolternstrasse 44, Zurich, Switzerland] with a microwave system 71, as generally described above, mounted on the arm 72 so that the waveguide opening may be brought into position above a workpiece.

EXAMPLE

The system shown in the preceding example might be used, for example, to join a weather strip assembly to a metal door frame using a thermoset adhesive. A custom fixture 81, designed for a specific workpiece, may be provided as shown in FIG. 8. The waveguide applicator would be brought down close to the workpiece to apply microwave energy to a small area of the weather strip assembly to locally spot-cure the adhesive or "tack" the strip into place; the process would be repeated at enough other places to secure the assembly in its desired pattern. Then, the entire assembly could be moved into a larger oven (which may accommodate racks with many such assemblies) for a longer cure to complete the adhesive bond around the entire periphery of the door frame.

Figure 11:
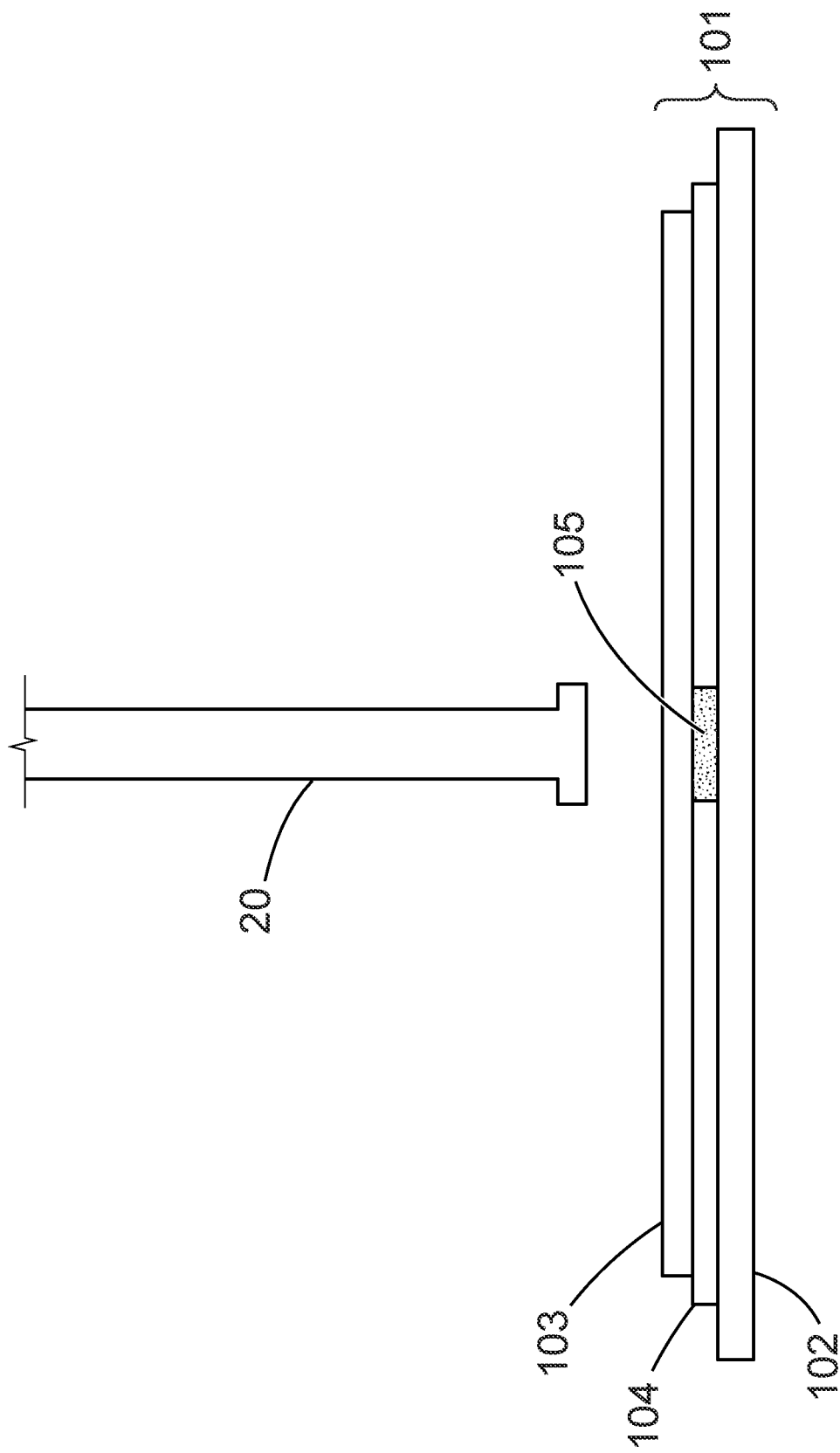
FIG. 11 illustrates schematically the use of a small, near-field microwave applicator to expose a small portion of an adhesive to localized microwave energy while the remaining portion of the adhesive remains unexposed to microwaves.
Figure 12:
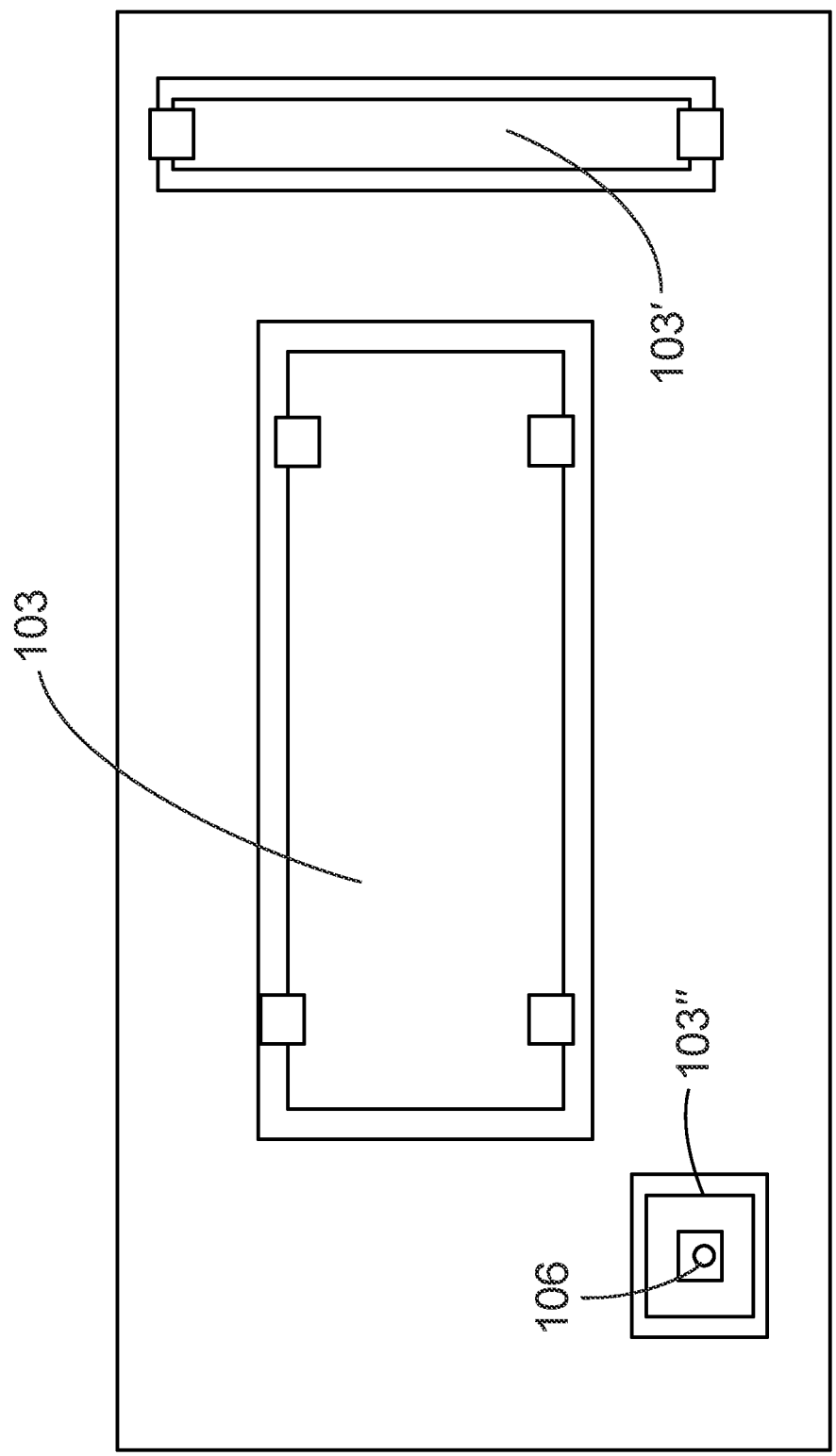
FIG. 12 illustrates an assembly having a number of components spot-bonded into an assembly containing areas of uncured adhesive, ready to be fully cured in a subsequent treatment.
Figure 13:
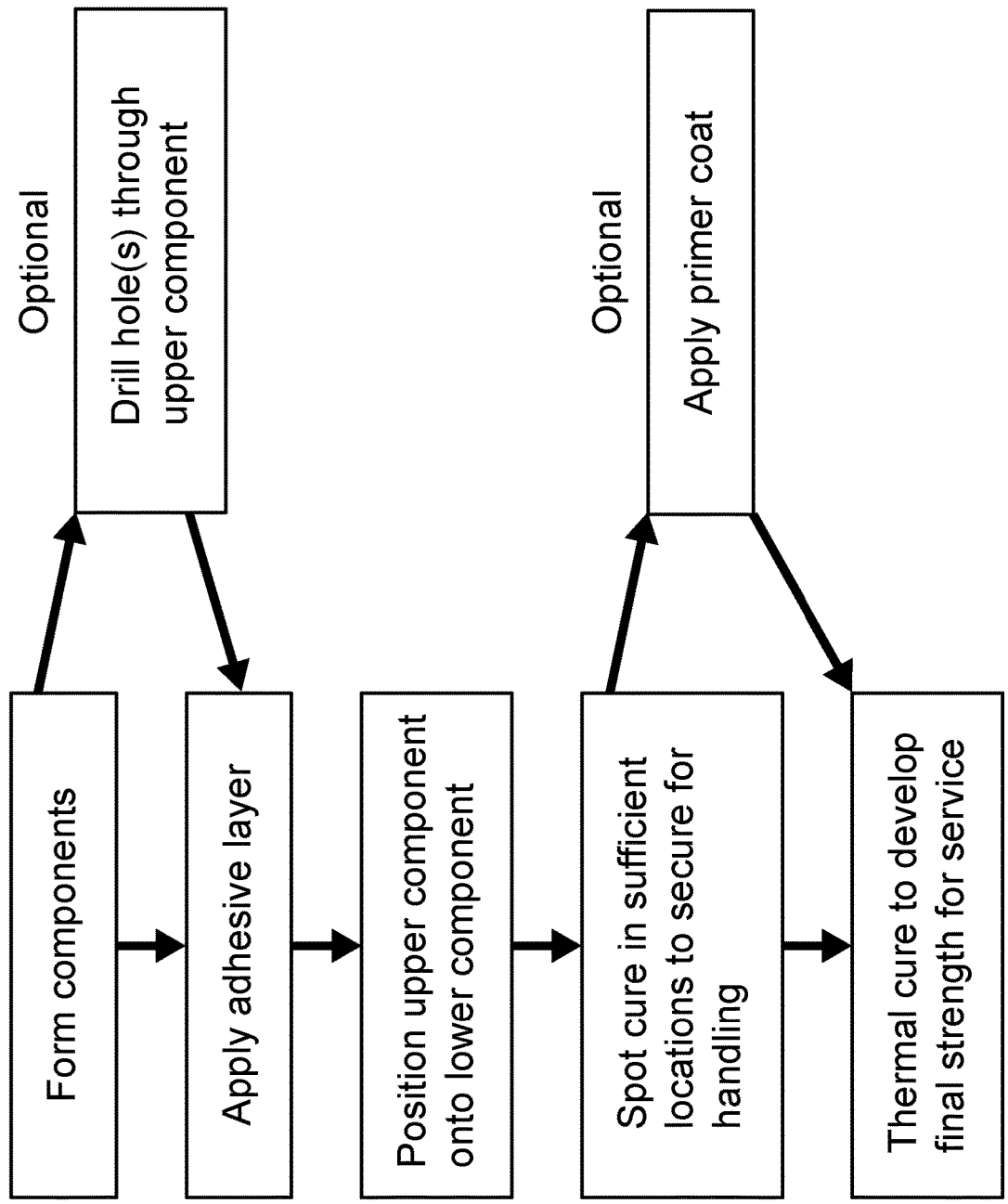
FIG. 13 illustrates schematically the steps of assembly, spot curing, and final curing.

FIGS. 11-13 show the concept of spot curing or "tacking", in which an assembly 101 includes components to be joined 102, 103 having a layer of thermoset adhesive 104 applied along an extended contact area. As shown in FIG. 11, an open waveguide applicator 20 is brought close to the assembly and briefly applies microwave energy to a small spot to cure a small volume 105 of the adhesive 104. This may be repeated at one or more other spots as needed to temporarily secure the adhesive joint and give the assembly adequate strength to proceed to further operations, after which a final thermal treatment cures the remaining adhesive to develop the ultimate strength needed for service. The process steps are illustrated schematically in FIG. 13.

Applicants contemplate that a preferred system will spot cure only enough of the adhesive joint to ensure adequate structural integrity for subsequent handling, after which the assembly will receive a final (oven or IR) cure. Any one spot treatment will therefore represent preferably less than 20%, and more preferably less than 10% of the total area that will ultimately be adhesively bonded. The number of spots to be cured may vary with the size of the upper component 103, as shown generally in FIG. 12, which shows schematically that small components 103" may get one spot in the center, larger components 103' may get a spot at each end, and still larger components 103 may get more spots, e.g., a spot every 10-30 cm. Similarly, irregularly shaped components (not shown) might get spot cures near bends, etc.

EXAMPLE

For cases where it is desirable to launch the microwaves through the top composite, rather than into an edge, Applicants contemplate that a small hole 106 may be drilled through the top laminate 103" as shown schematically in FIG. 12 (preferably as a prior operation rather than after it has been pressed onto the adhesive layer). When the microwave launcher 20 is placed over this pre-drilled hole 106, the microwave energy can therefore pass down into the adhesive layer and then propagate radially outward, guided by the plies as was earlier noted in cross-ply CFC laminates. The relatively high loss tangent of the uncured adhesive will help limit the cured area to the desired size, and the user may determine the optimal hole diameter through routine experimentation based on such factors as the frequency range, resin properties, fiber conductivity, and the like.

It will be appreciated that the drilled hole will not be necessary if the top component is a fiberglass composite (GFC), which is substantially transparent to microwaves.

Applicants contemplate that with proper formulation of the adhesive material the final cure may be carried out simultaneously with an existing step of baking a primer coat on the finished assembly as illustrated schematically in FIG. 13. As an example, ChromaGLAST™ epoxy primer/sealer [Fibre Glast Developments Corp., Brookville, Ohio] typically cures in 60-120 minutes at 70° F., or 25 minutes at 140° F. So in this case, an adhesive may therefore be selected that will cure at 140° F. simultaneously with the primer curing. Other cure temperatures may be selected by the user depending on the combination of adhesive and primer that are selected by the user.

It will be appreciated that the area of the adhesive bond that is fully cured by the microwave spot treatment may be slightly larger or slightly smaller than the aperture of the launch structure 20. The reasons for this may include a thermal gradient that reduces the temperature of the material around the periphery of the area being irradiated, or conversely, propagation of microwaves outward in a direction parallel to the bond line. However, because the uncured thermoset resin tends to be very lossy, it is not expected that curing will extend outward much beyond the "footprint" of the applicator.

In this context, it will be clear that when Applicants refer to "material to be cured" or "material to be treated", this means material to be cured in that particular heating cycle. In other words, an extensive bond line might be treated, as described above, in a series of discrete spots. The material to be cured in one particular cycle will therefore be that portion of the material that is under the applicator at the time, and all of that material will lie within one wavelength of the applicator (measured in the direction of microwave propagation).

EXAMPLE

Figure 14:
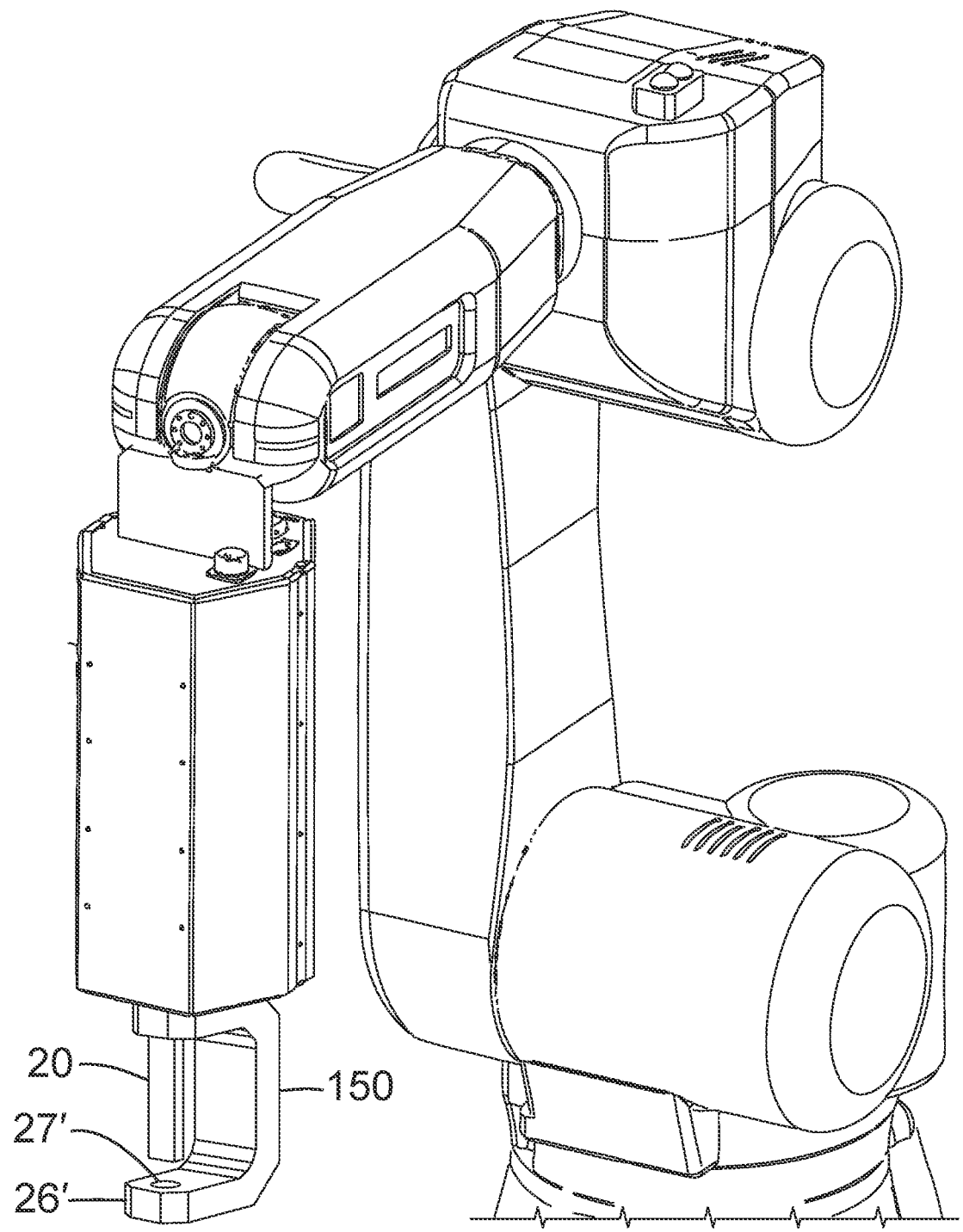
FIG. 14 illustrates another example of the invention, in which a unitary assembly includes the waveguide launcher, and a small backing plate held at a selected distance from the launcher and having a recess facing toward the launcher.

FIG. 14 illustrates another example of the invention, which may be particularly suitable for treating narrow strips of material, as well as continuous or semi-continuous strips. In this configuration, the backing plate 26' is supported by a unitary bracket 150 so it is held at a selected distance from the launcher 20 with the pocket 27' directly opposite the launcher. The material to be treated would pass through the gap formed therebetween. It will be appreciated that the bracket 150 may be rigidly mounted, or it may be slidably mounted on launcher 20 so that the gap may be adjusted for different workpieces.

EXAMPLE

The inventive device may be used as follows:
1. Articles to be joined are held in a fixture with an adhesive layer in the joint space;
2. The robot arm positions the waveguide opening over the area of the joint to be cured;
3. A means is optionally provided to apply pressure to the adhesive bond during microwave heating;
4. Microwave power is applied for a sufficient time to create an adhesive bond of adequate strength; and,
5. If desired, the microwave applicator is moved to another place on the workpiece and the process is repeated.

It will be appreciated that in many cases it will be desirable to apply some compressive pressure to the workpiece as the adhesive bond is curing. There are many suitable means of achieving this function, as described in the following examples and in FIGS. 2-5.

EXAMPLE

FIG. 2 shows schematically a flanged waveguide 20, positioned at a selected distance above workpiece 21, which includes top and bottom components 22, 23 and an adhesive layer 24. Pinch rollers 25 apply pressure to the adhesive during cure. This arrangement is particularly suitable for continuous or semi-continuous strips or webs.

Figure 3:
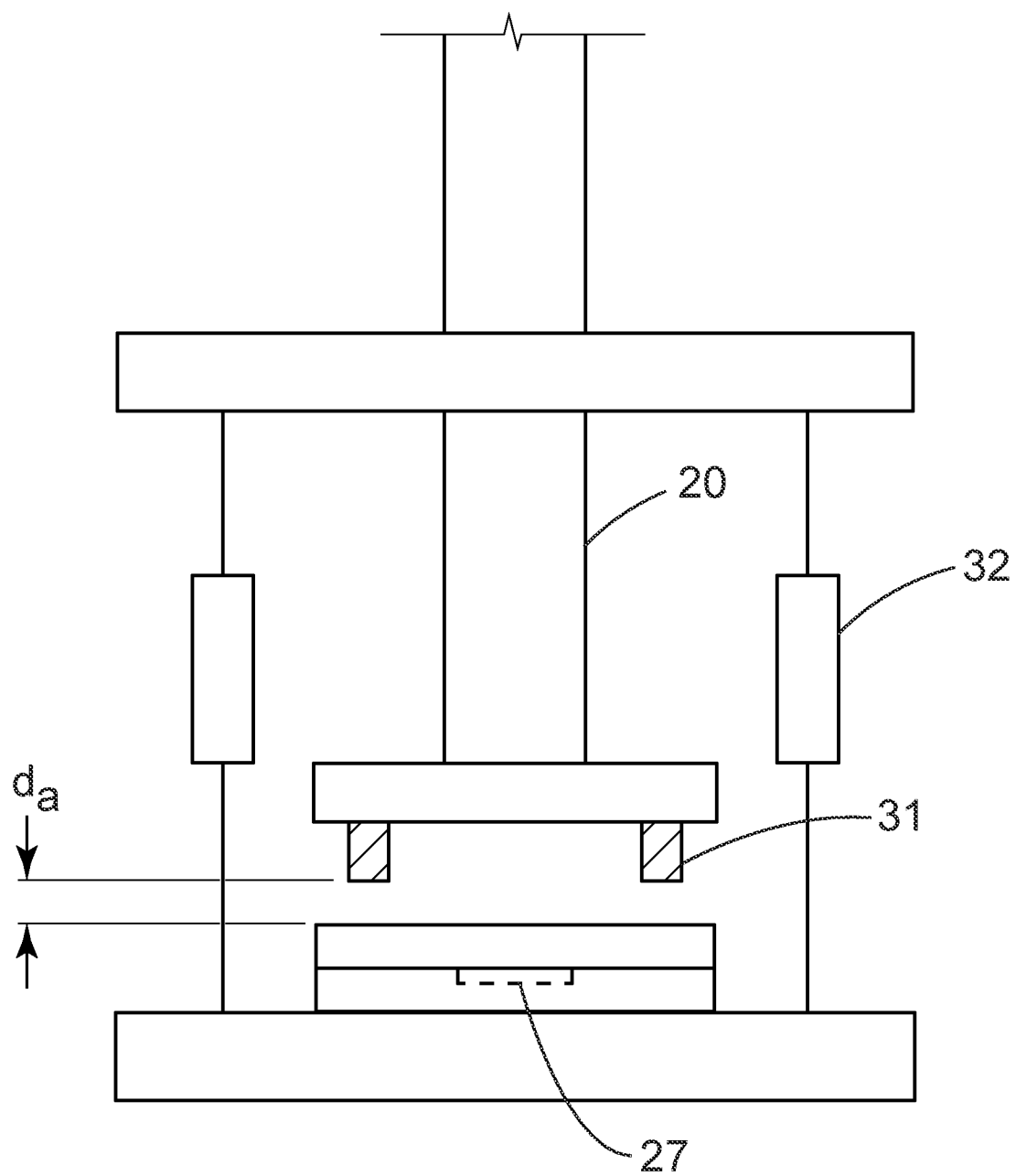
FIG. 3 illustrates a ridged waveguide microwave applicator in accordance with another aspect of the invention. In this configuration, small projections on the face of the waveguide flange provide a fixed standoff distance when actuators pull the workpiece into position and apply a compressive force on the workpiece.
Figure 4:
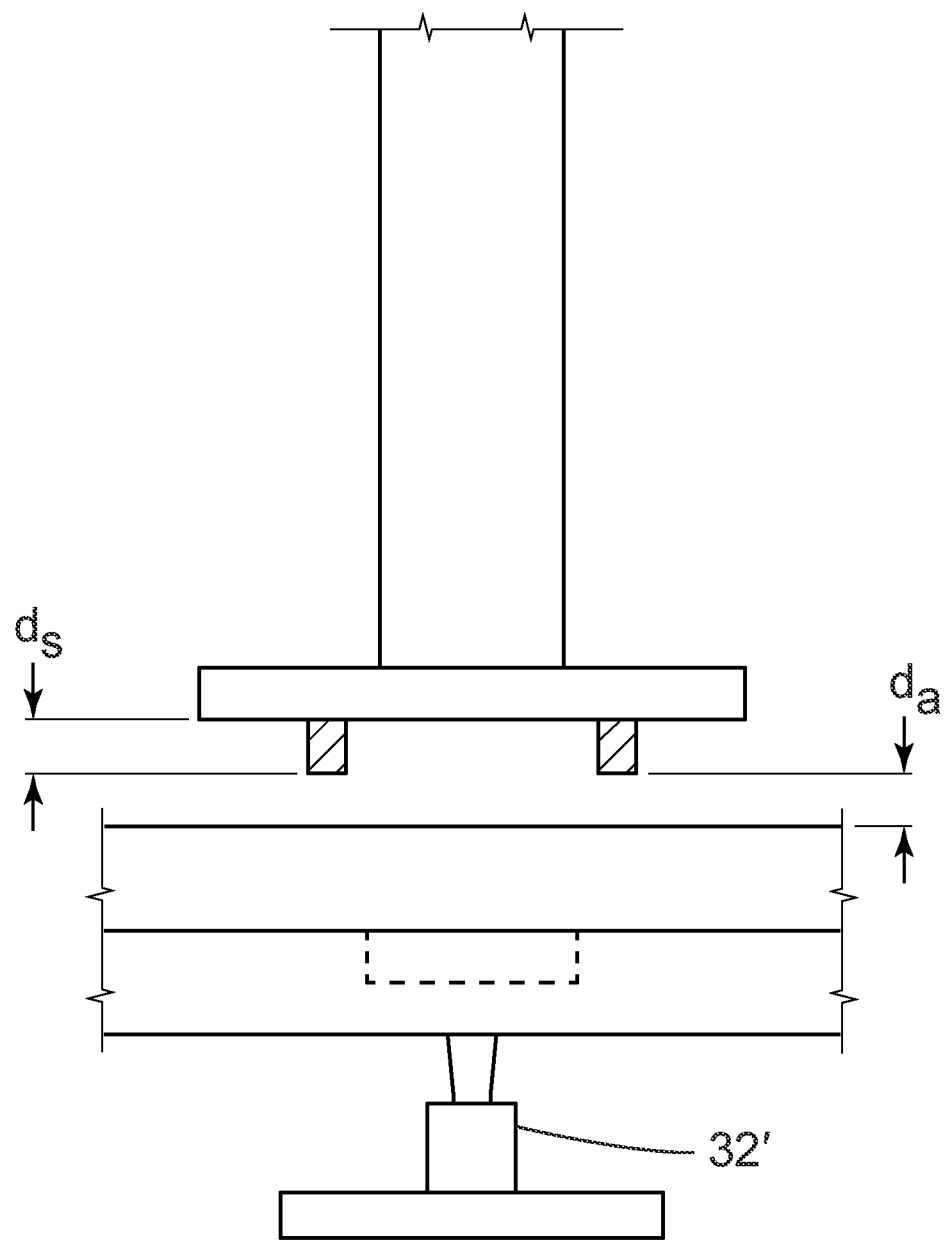
FIG. 4 illustrates a ridged waveguide microwave applicator in accordance with another aspect of the invention. In this configuration, small projections on the face of the waveguide flange provide a fixed standoff distance when an actuator under the backing plate pushes the workpiece into position and applies a compressive force on the workpiece.

For situations where optimal heating requires a standoff distance $d_s$ between the applicator (microwave launch structure) and the workpiece, projecting stubs 31 may be provided on the face of launcher 20 as shown generally in FIG. 3. Actuators 32 draw the workpiece some distance $d_a$ bringing it into contact with stubs 31. As shown schematically in FIG. 4, actuator 32' may be located below the workpiece and backing plate and push the workpiece into contact with the stubs on the applicator. Alternatively, FIG. 5, an extendable foot or ring 50 may be slidably attached to launcher 20, so that it can be extended forward of the termination by a selected amount during process setup, and then locked into place using a set screw 51 or other suitable means. For convenience, fiducial marks (not shown) may be placed on the mounting so that an operator can easily set the extension to a particular value. A pneumatic, hydraulic, or electromechanical actuator 32, 32' above or below the workpiece, with operative travel $d_a$, would then draw the workpiece against the projecting part to compress the bond area while maintaining the preset launch standoff distance. This approach may be adapted to deploy on the arm 72 of an industrial robot 70 to treat multiple spots on a large workpiece, or adapted for use in an assembly line to treat individual components as they come to the particular station.

It will be understood that the actuator 32, 32', moving through distance $d_a$, may also conveniently engage an interlock switch (not shown) to turn on microwave power when the workpiece is in optimal position and properly compressed against stubs 31.

EXAMPLE

It will be appreciated that the invention may equally well be carried out in an alternate configuration in which the microwave power supply is stationary and the workpiece is held by the robot arm. In such cases, the robot would move the part and bring the area to be heated into proximity with the (stationary) microwave applicator.

EXAMPLE

A straight waveguide was connected to the power supply described above and extended into the chamber of a Micro-Cure 5100 microwave processing system [Lambda Technologies, Morrisville, NC]. The waveguide terminated 0.25 in. above the sample, which consisted of a lap joint formed between an aluminum plate and a carbon fiber composite. The aluminum was on the bottom, and a small coupon of aluminum was placed under the far end of the carbon fiber composite to support it in a horizontal position parallel to the aluminum plate. The sample was manually compressed to distribute the thermoset adhesive across the joint surface, but no pressure was applied during processing. Thermal paper was placed under the assembly and several fiber optic temperature probes were placed proximate to the lap joint.

Microwave power was swept over the frequency range 5.85-6.65 GHz; 400 W was applied for 35 seconds. Temperature directly under the waveguide reached 250° C.; the temperature about 2 inches away, under the aluminum plate, was about 93° C. Darkening of the thermal paper showed that the area of the lap joint was efficiently and uniformly heated. Upon cooling, the sample showed good adhesion.

Modification of back plate for improved efficiency

In the foregoing examples, it was generally contemplated that at least part of the supporting fixture comprises a metal backing plate located adjacent to the side of the workpiece opposite the side from which microwave energy is launched. This is intended to reflect energy back into the workpiece for better efficiency, compared to having some energy pass completely through the workpiece and thereby be lost. Applicants speculated, however, that the proximity of a highly conductive back wall directly adjacent to the workpiece might lead to several sources of inefficiency:
1. a region of low E field will exist next to the wall because of its electrical conductivity; and,
2. some heat might be conducted into the wall, thereby lowering the temperature of the heated part of the workpiece.

Applicants therefore investigated various modifications in which a small recessed area 27 was created on the face of the reflector plate 26 and oriented so that it was directly facing the microwave launch structure 20, as shown generally in FIGS. 2-5. The workpiece, therefore would be placed between the launch structure and the reflector plate, with the small hollowed-out area 27 serving to allow a higher E field to develop on the back side of the workpiece and simultaneously reducing the outward conduction of heat from the workpiece into the reflector plate.

EXAMPLE

In the first test of the inventive concept, a rectangular pocket 75 mm×25 mm×6 mm deep was milled in a steel plate; the plate was placed under a sample composite including adhesive, with the pocket directly under the microwave launcher. Applicants found, surprisingly, that this produced a faster and more controlled process result. Applicants further observed that the orientation of the pocket relative to the launcher (i.e., orientation of the long axis of the rectangle relative to the E field of the microwave) had a further effect on heating rate.

Figure 6A:
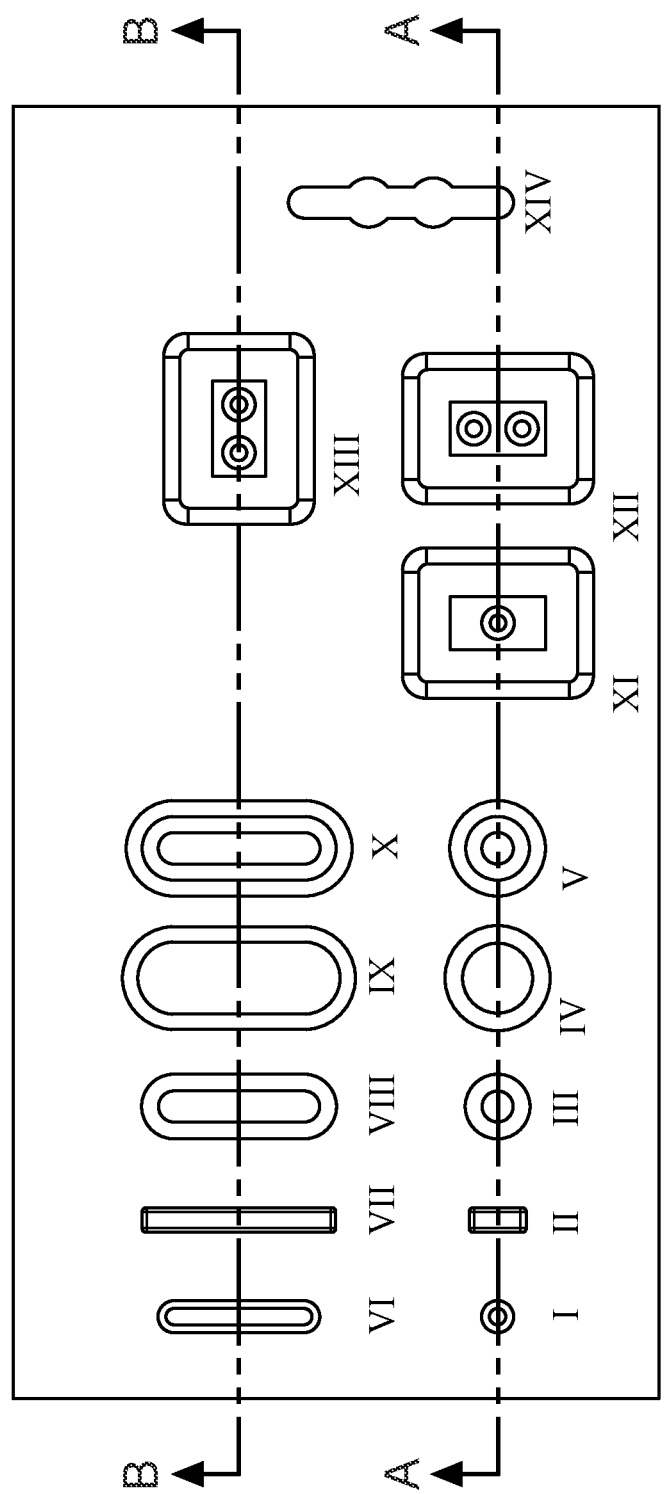

In one series of experiments, a single metal plate was used, 800 mm×400 mm×15 mm thick; a series of recesses or pockets were formed on the front surface by end milling, FIG. 6. The dimensions of these features are summarized in Table 1. Those skilled in the art will appreciate that any suitable means may be used for creating the recesses, including machining, drilling, stamping, casting, or any other methods of metal forming.

TABLE 1

Dimensions of machined surface features, in mm.

| No. | L, mm | W, mm | D, mm | R (Corner), mm | R (Fillet), mm | Notes |
|---|---|---|---|---|---|---|
| A1 | 80 | 8 | 5 | 4 | | a |
| A2 | 80 | 10 | 5 | 5 | | a |
| A3 | 80 | 15 | 5 | 5 | | a |
| A4 | 80 | 20 | 5 | 5 | | a |
| A5 | 80 | 30 | 5 | 5 | | a |
| B1 | 80 | 8 | 7 | 4 | | a |
| B2 | 80 | 10 | 7 | 5 | | a |
| B3 | 80 | 15 | 7 | 5 | | a |
| B4 | 80 | 20 | 7 | 5 | | a |
| B5 | 80 | 30 | 7 | 5 | | a |
| C1 | | | 10 | 10 | 5 | b |
| C2 | | | 10 | 15 | | c |
| C3 | 30 | 30 | 10 | 5 | 10 | d |
| C4 | 30 | 30 | 10 | 5 | | e |
| C5 | 50 | 30 | 10 | 5 | | f |
| C6 | 80 | 30 | 10 | 5 | | g |
| D1 | 38.5 | 10 | 15 | 5 | | h |
| D2 | 75 | 20 | 15 | 10 | | h |
| D3 | | | 7 | 10 | | h |
| D4 | 30 | 10 | 5 | 5 | | i |
| D5 | 47.5 | 10 | 7 | 5 | | i |
| D6 | 62.5 | 20 | 7 | 10 | | i |
| D7 | 87.5 | 30 | 7 | 15 | | i |
| D8 | Outer arc radius 50 | Inner arc radius 12.5 | 12.5 | 12.5 | | j |

Notes
a Rectangle, radius corners
b Round, filleted bottoms
c Round, no fillet
d Square, radius corners and filleted bottoms
e Square, radius corners
f Rectangle, radius corners
g Circle, radius bottom
h Edge slot, rectangular with round end, through
i Edge slot, rectangular with round end
j C-shaped slot Systematic studies were undertaken to determine the effects of pocket dimensions, as well as spacing between the launch structure and the workpiece, as described in the following examples.

EXAMPLE

A 3 mm thick Glass-Fiber Sheet Moulding Compound (GFSMC) test piece measuring 150 mm×60 mm was placed directly above the metallic plate that contains the machined reflector pockets. The work piece and pocket was then placed directly underneath the waveguide with the orientation of its long end aligned with that of the waveguide, given it is rectangular in shape.

EXAMPLE

To determine the temperature measuring point on the test piece, a thermal fax paper was employed to detect the focused heat area on the GFSMC panel. After firing the VFM, it was found that the heated area on the GFSMC is located directly under the geometric center of the rectangular waveguide. Therefore, a fiber optic temperature sensor was attached to the focused heat area of the GFSMC workpiece with a polyimide thermal tape.

EXAMPLE

The heating rate of each pocket tested was measured by the time required to run a 27.5 to 50° C. heating cycle with a fixed level of VFM power applied directly to the GFSMC workpiece. The temperature of the test piece was reset to 27.5° C.±0.5° C. after each testing cycle was completed before starting the next one. The VFM program recipe was set to stop when 50° C. reading was reached on the fiberoptic sensor to prevent overheating. To accurately measure the time required, a digital stopwatch was also employed to count the time between the onset of the VFM program and 50° C. surface temperature reading.

EXAMPLE

The effectiveness of each pocket design was empirically examined by testing the time required to complete the standard heating cycle. Among all the pockets tested, it was found that the dome-shaped pocket C1 had the best overall performance with heating cycle completed in just 3.1 s, which is almost 8 times faster than using a metal plate with no pocket. The pockets A1 and D3 were second fastest heating with both configurations achieving a 3.9 s cycle time.

EXAMPLE

By comparing pockets A1-5 with B1-5, it was found that on average the 5 mm deep pockets heat up the workpiece 30% faster than do the 7 mm deep pockets. The heating efficiency also decreases with the higher width of the pockets, so that less than half the time is required to complete the heating cycle when using A1 and B1 pockets compared to that of A5 and B5 pocket. In contrast, the length of the pocket did not show significant influence on the cycle time.

EXAMPLE

Empirical evidence shows that having an open end or exit to the pocket did not significantly affect the efficiency of the pocket; however, it was curiously noted that pocket D6 with an open end performed better than the enclosed B4 pocket with similar specifications and the D3 pocket is one of the best performing pockets, which enabled 3.9 second cycle time. It was also found that filleted bottom edges improve the overall efficiency of the pocket since there is a 15% further reduction in cycle time when comparing pocket C3 with that of C4.

In support of the experimental work, modeling studies were performed using COMSOL Multiphysics® software (COMSOL, Inc., 100 District Avenue, Burlington, MA 01803) to verify the effect of the backwall pocket feature for RF heating results using VFM. To simulate VFM, a sequential frequency domain study was used to average the results. The frequency range used by Lambda Technologies' VFM for this project is a portion of the 'C-Band', 5.85 GHz to 6.65 GHz. A step resolution of 25 MHz was chosen to provide enough clarity and minimize calculation time. A MW power input of 200 W was used for all studies. The geometry used for this study consisted of an aluminum back shield with either a pocket feature or no pocket feature, a glass-fiber reinforced polymer bottom panel, a ½" wide bead of adhesive, a silica glass top panel, a WR137 waveguide with or without a rectangular MW gain horn, and a carbon fiber "blanket" or horn cover shield.

TABLE 2

Pocket geometry designations and dimensions used in modeling. (All pockets were 10 mm deep)

| No.[a] | Description |
|---|---|
| I | 10 mm radius with 5 mm internal radius |
| II | 0.622 in × 1.372 in "WR137" with 0.118 in internal radius |
| III | 20 mm radius with 10 mm internal radius |
| IV | 22.5 mm radius with 10 mm external radius |
| V | 20 mm radius with 10 mm external radius plus a central 10 mm radius hemispherical protrusion |
| VI | 10 mm radius with 5 mm internal radius × 80 mm long slot |
| VII | 0.622 in × 1.372 in "WR137" with 0.118 in internal radius × 120 mm long slot |
| VIII | 20 mm radius with 10 mm internal radius × 80 mm long slot |
| IX | 22.5 mm radius with 10 mm external radius × 80 mm long slot |
| X | 20 mm radius with 10 mm external radius plus a central 10 mm radius hemispherical protrusion × 80 mm long slot |
| XI | 10 mm radius with 5 mm internal radius surrounded by 73 × 98.4 pocket with 10 mm external radius |
| XII | Double 10 mm radius with 5 mm internal radius surrounded by 73 × 98.4 pocket with 10 mm external radius |
| XIII | Double 10 mm radius with 5 mm internal radius surrounded by 73 × 98.4 pocket with 10 mm external radius, rotated 90° |
| XIV | 19 mm dovetail × 120 mm long slot with 2 off-center plunges spaced at 40 mm |

[a]Refer to FIG. 6 for complete illustrations

EXAMPLE

In one simulation, the effect of pocket geometry was analyzed. Power was introduced via an open WR137 waveguide with no horn, located either 4 or 10 mm above the workpiece. Pockets were: WR137 pocket 10 mm deep with R3 internal radius [Pocket No. II], R10 pocket 10 mm deep with R5 internal radius [Pocket No. I], and no pocket. Maximum steady state temperature indicated in this study was achieved with launch distance of 4 mm, and the WR137 pocket, 10 mm deep, with 3 mm internal radius, Table 2. The temperatures were calculated by the model from E field, loss tangent, and thermal conductivity. For this set of simulations, the top surface of the backplate was defined as a constant 20° C.

TABLE 3

Pocket geometry simulation

| Pocket type | Launch distance mm | Max E field, kV/m | Max T ° C. |
|---|---|---|---|
| R10, 10 mm deep, 5 mm internal radius | 10 | 62 | 115 |
| WR137, 10 mm deep, 3 mm internal radius | 4 | 91 | 279 |
| No pocket | 10 | 51 | 65 |

EXAMPLE

In another simulation, the effect of pocket variation was analyzed. Power was introduced via a WR137 waveguide terminated with a gain horn with an opening ~90×67 mm, located 10 mm above the workpiece. Pockets were: R10 cylindrical pocket R5 internal radius [Pocket No. I], R22.5 cylindrical pocket with R10 top edge radius [Pocket No. IV], R20 cylindrical pocket with R10 center hemispherical projection [Pocket No. V], R10 cylindrical pocket surrounded by a rectangular pocket with R10 top edge radius [Pocket No. XI], double R10 cylindrical pockets off center and surrounded by a rectangular pocket with R10 top edge radius (aligned with either the YZ plane [Pocket No. XII] or the XZ plane [Pocket No. XIII], a dovetail groove pocket with two off-center plunges [Pocket No. XIV], an R20 pocket with R10 inside radius [Pocket No. III], and an R10 slot pocket with R5 inside radius [Pocket No. VI]. Maximum steady state temperature indicated in this study was achieved with the 20 mm radius×10 mm deep plus a 10 mm radius hemisphere protrusion in center, Table 4.

TABLE 4

Simulation of various pocket configurations

| Pocket Type, all 10 mm deep | E-field max, kV/m | Tmax, ° C. | Tmax, location |
|---|---|---|---|
| R10 mm w/R5 mm internal | 54 | 126 | Center Target focused and well distributed along the adhesive bead |
| R22.5 w/R10 top edge | 39 | 62 | Center Target focused |
| R20 w/R10 top edge plus R10 hemisphere center protrusion | 62 | 200 | Center Target focused |
| R10 plus surrounding rectangular pocket w/R10 top edge | 36 | 73 | Focused away from center target along the adhesive bead line |
| Double R10 pockets aligned to H-plane plus surrounding rectangular pocket | 49 | 59 | Focused away from center target along the adhesive bead line |
| Double R10 pockets aligned to E-plane plus surrounding rectangular pocket | 38 | 133 | Center Target focused |
| Dovetail groove with double plunge along E-plane | 37 | 116 | Center Target focused |
| R20 mm w/R10 internal | 30 | 86 | Center Target focused |
| R10 mm w/R5 mm internal slotted trench | 37 | 98 | Center Target focused |

EXAMPLE

In another simulation, the overall outline of the pocket corresponded to WR137 geometry [1.372 inches (34.8488 mm)×0.622 inches (15.7988 mm), and the analysis involved variations in the depth and internal corner radii. Power was introduced via an open WR137 waveguide with no horn. In this study, the maximum steady state temperature was achieved with a 4 mm launch distance and a 5 mm deep pocket with a 3 mm internal radius. The maximum E field was calculated to be 103 kV/m and the maximum temperature was 320° C.

EXAMPLE

In a further simulation, the overall outline of the pocket again corresponded to WR137 geometry with depth of 10 mm, and the analysis involved variations in launch distance only. Power was introduced via an open WR137 waveguide with no horn. In this study, the best heating was achieved with the 4 and 5 mm launch distances. The maximum E field was calculated to be 91 kV/m for 4 mm and 95 kV/m for 5 mm, with indicated temperatures of 279 and 274° C. respectively.

The insights gained from modeling and experimental heating runs may be used to guide the optimization of particular process applications through routine experimentation. FIGS. 7A-B show how a plate with different pocket features may be placed under a robotically controlled applicator to perform various experiments or treat actual components.

EXAMPLE

Figure 5:
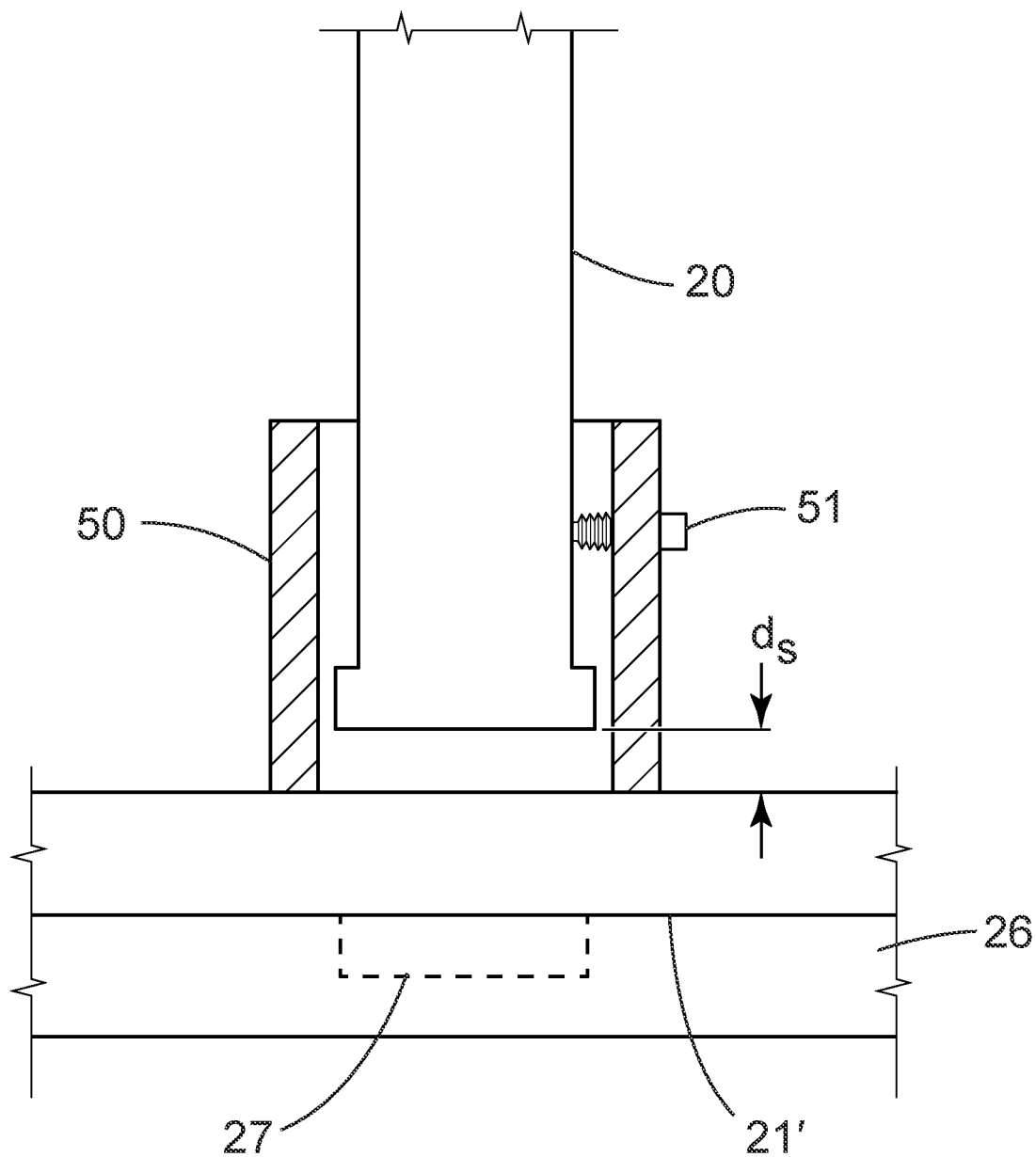
FIG. 5 illustrates another example of the invention, in which the ridged waveguide launcher has an adjustable means to vary the standoff distance between the waveguide flange and the workpiece.
Figure 9A:
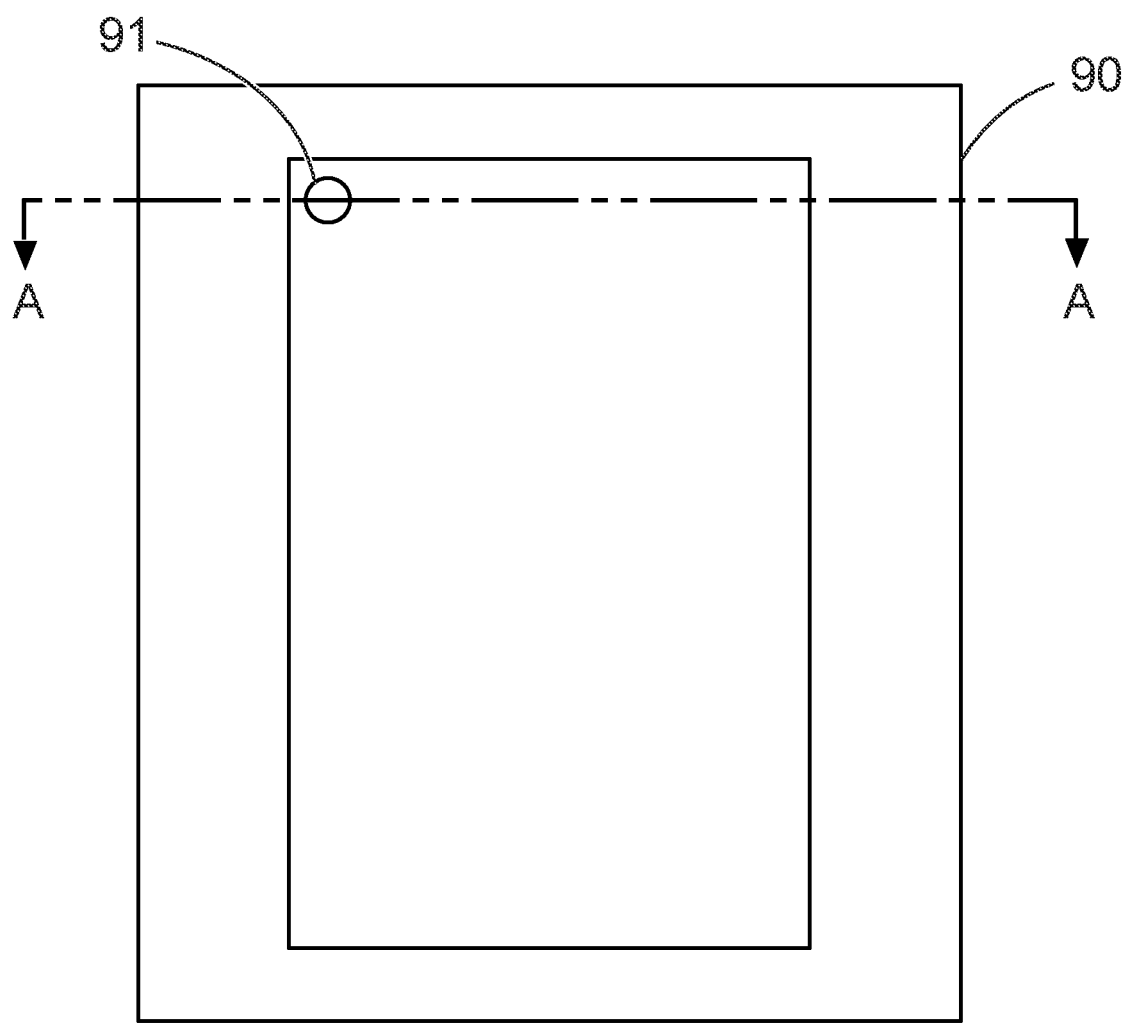
FIGS. 9A-B illustrate a backing plate configured to accommodate various interchangeable pocket features. The plate contains a locating pin so that a particular pocket can only be inserted in one orientation.
Figure 9B:
Figure 10:
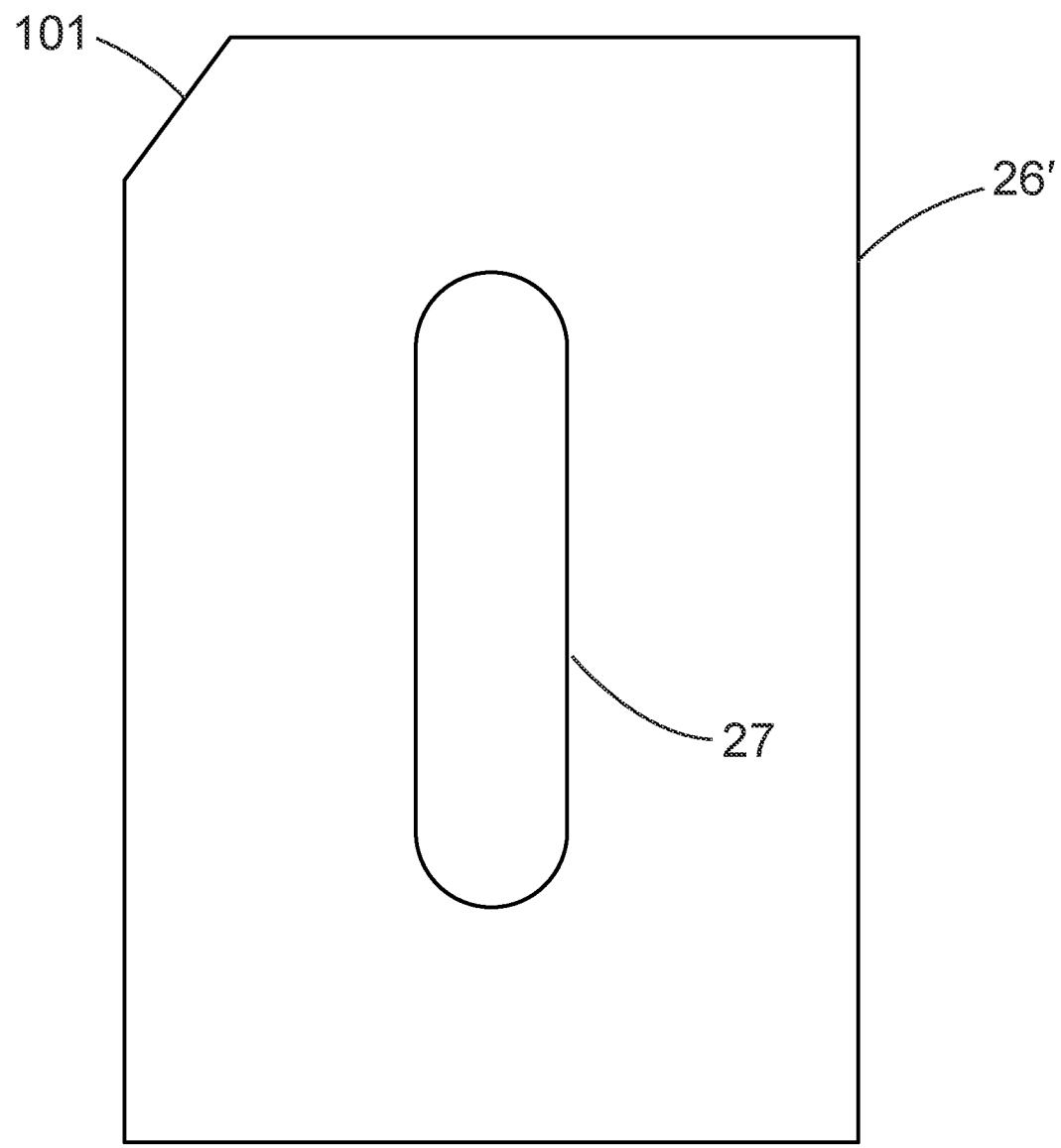
FIG. 10 illustrates a backing plate insert having a pocket designed for a particular component or process. A notch in one corner allows the insert to be placed in only one orientation within the backing plate.

The adjustable standoff described in FIG. 5 may be usefully combined with a set of backing plates having different pocket features. It will be understood that many of the aforedescribed pocket features are not rotationally symmetrical and the long axis of the pocket 27 will need to be oriented in one way relative to the E field emerging from the launcher for proper operation. The backing plate 26' may therefore be configured to eliminate the possibility of incorrect mounting in fixture 90, e.g., by making it rectangular rather than square, clipping off one corner 101, drilling holes, slots, or other features that can only engage pins 91 in one orientation, or clearly marking it with an arrow indicating the mounting direction; one example is generally shown in FIGS. 9-10. To qualify the process for a particular application, one would determine, through routine experimentation, the optimal pocket size and geometry, and the optimal standoff distance. These factors would then become part of the standard process recipe for that component, in addition to the other parameters such as time, power, heating profile, etc.

EXAMPLE

Once a particular process is qualified, operation in the production environment would typically follow the steps of:
1. Adjust the standoff control device to the specified distance and lock into place.
2. Select the backing plate with the specified pocket geometry and secure into fixture.
3. Adjust the motion control device (travel/pressure) as needed to provide appropriate compression during cure.
4. Set all heating parameters according to the specified profile.
5. Insert workpiece between launcher and backing plate.
6. Actuate motion control device to clamp workpiece into position
7. Apply microwave power according to specified profile.

8. Actuate motion control device to release workpiece.
9. Repeat steps 5-8 for each subsequent workpiece.

EXAMPLE

Applicants contemplate that the invention can also be adapted to continuous processes, such as curing an adhesive bead on a long, generally straight, component, heat sealing a long seam or closure, etc. For such applications, pressure may be applied to the workpiece by two pairs of pinch rollers 25, one on either side to the launch structure, as shown generally in FIG. 2. Those skilled in the art will appreciate that routine motion control actuators can be used to control the gap and pressure exerted by the rollers, as well as to change these parameters for different workpiece geometries.

It will be appreciated that the invention relies on near-field exposure to microwaves emerging from a launch structure, rather than on the conventional far-field exposure of a workpiece contained within a closed metal applicator cavity. It is therefore desirable to provide a means of reducing leakage of microwave energy into the surrounding workspace, for worker safety as well as to prevent electromagnetic interference. This is especially important when the launcher is spaced apart from the workpiece by a selected standoff distance.

EXAMPLE

In the foregoing examples, it was generally contemplated that the pocket feature 27 is a machined hole with fixed dimensions. It will be appreciated, however, that plate 26 may be configured such that one or more dimensions of pocket 27 may be adjustable. Such adjustability may be useful as a development tool, or it may be used in a production system as an alternative to the interchangeable plate 26' shown generally in FIG. 10. Such an adjustable plate (not shown) may comprise sliding elements that can move laterally to make pocket 27 wider or narrower, and/or an adjustment to make the pocket deeper or shallower; this could employ a bottom that slides in and out, driven by a screw or other conventional mechanism, or by shims that may be inserted at the bottom of the pocket. The skilled artisan will therefore have a wide range of process adjustments to accommodate different components, adhesives, and process requirements.

In the foregoing examples it was generally assumed that many preferred applications will involve joining polymer-matrix composites to one another. It was noted that the method can also be used if the top layer of the workpiece (i.e., that side facing the microwave launcher) is electrically conductive and therefore tends to reflect microwave energy. The solution in that case is to form a small opening in the conductive sheet (106 in FIG. 12) so that microwave energy can enter the adhesive layer and propagate outward to a sufficient degree to create a cured area. However, if the metal layer is on the bottom, the pocket feature 27 would be ineffective if it is formed in the back plate as shown in FIGS. 2-5. In such cases, the invention may be further modified by forming a small pocket in the metal component itself, as described more fully in the following example.

EXAMPLE

Figure 15:
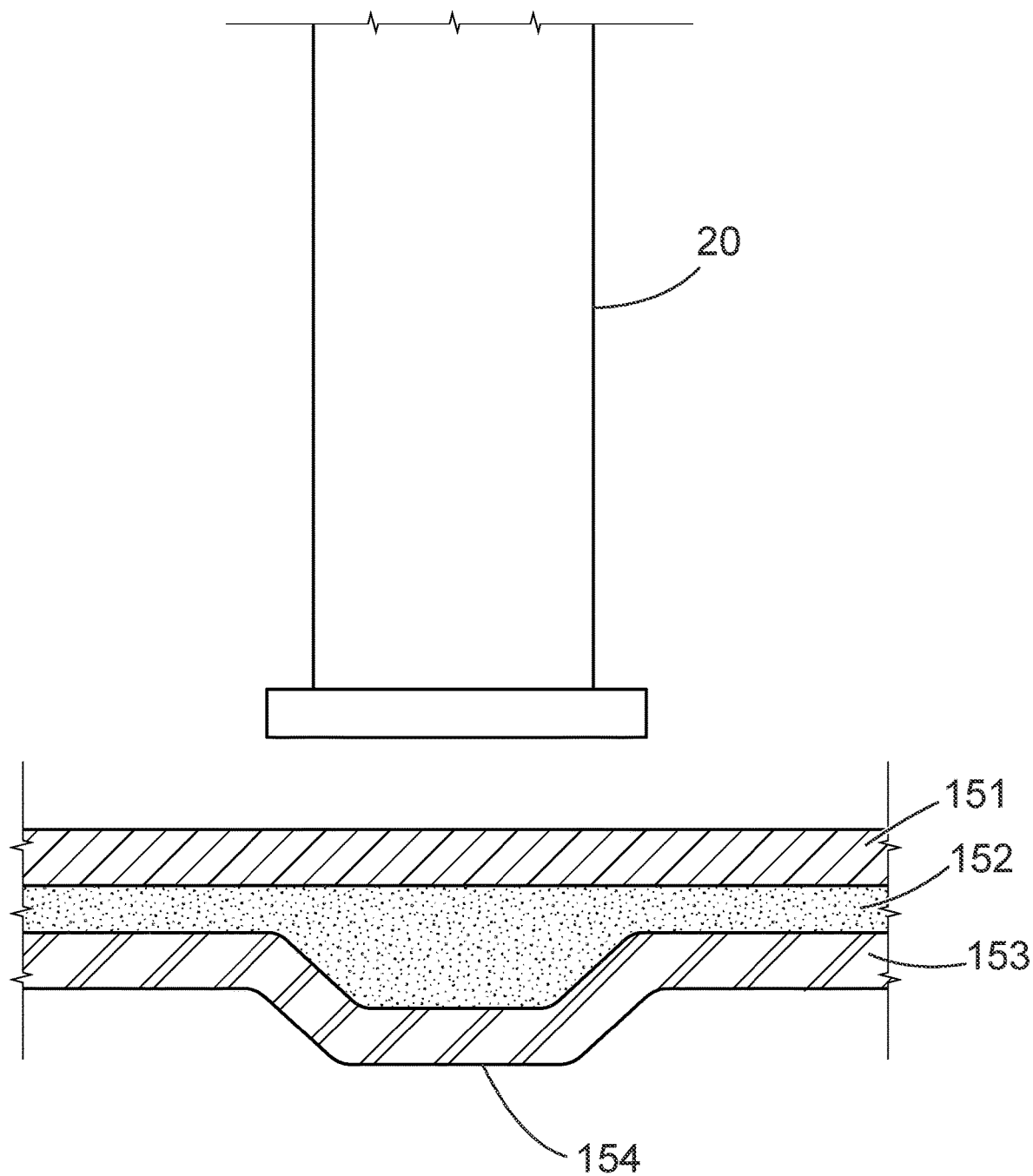
FIG. 15 shows another example of the invention, in which the lower component is metal, and a pocket feature is formed in the workpiece itself by pressing or stamping.

FIG. 15 shows schematically a workpiece having a polymer component 151, adhesive layer 152, and metal substrate 153. Substrate 153 has a blister-like pocket 154 formed by pressing or stamping. Adhesive 152 is applied as a bead or coating, and generally fills the pocket as the joint is compressed. This arrangement can be expected to enhance the heating for several reasons:

1. The "skin" of the blister 154 serves as the electrical equivalent of pocket feature 27; and,
2. The greater volume of adhesive filling the pocket will increase microwave absorption relative to a thin film of adhesive.

If both components are metal, a hole 106 can be formed in the top sheet as described in FIG. 12.

Although many of the foregoing examples are directed to polymers and adhesive curing, it will be appreciated that the invention is completely general and may be usefully employed in virtually any situation where localized or concentrated microwave heating is called for. Some examples might include: sterilization, viral deactivation, destruction of cancer cells, cooking or other food preparation steps, etc.

In the foregoing examples it was generally contemplated that many preferred applications will use a launcher that is configured as a straight waveguide with an open end, and a robotic manipulator will move the launcher from point to point and thereby cure small areas on an extended component. It will be appreciated, however, that a custom-built applicator may be preferred for high-volume applications in which it is more efficient to cure several spots on a component at one time. The following example describes the use of a slotted waveguide applicator in which the slots are aligned with pockets in a corresponding backing plate.

EXAMPLE

Figure 16:
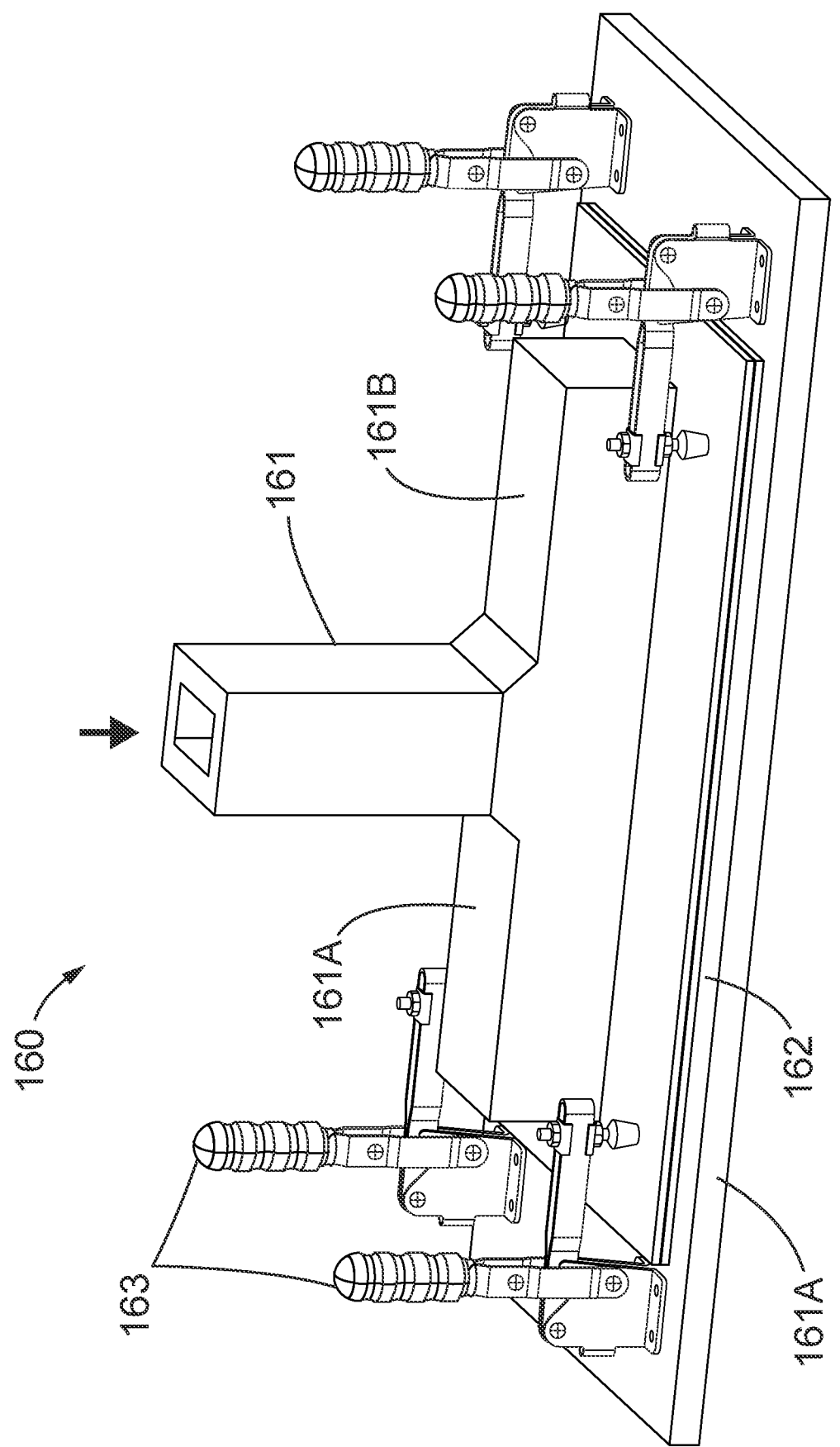
FIG. 16 shows another example of the invention, in which the microwave applicator includes a slotted waveguide with each slot facing a respective pocket feature.
Figure 17:
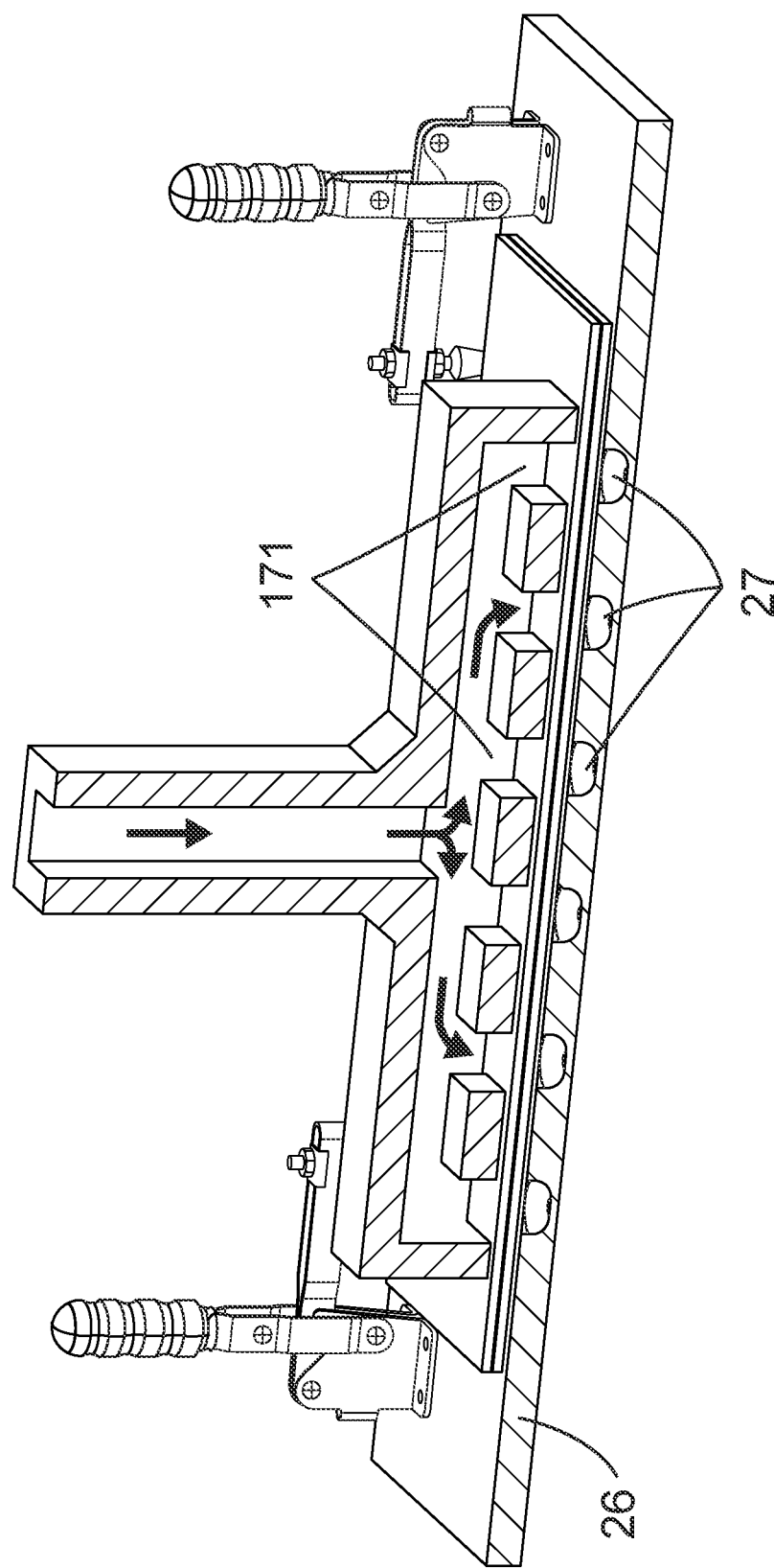
FIG. 17 shows a cross sectional view of the example shown in FIG. 16, to illustrate the relationship of the slotted waveguide to the pocket features on the backing plate, and shows the general flow of microwave energy during treatment.

A slotted waveguide applicator system 160 is shown generally in FIGS. 16-17.

FIG. 16 shows applicator 161, which comprises a waveguide formed into a tee so that microwave energy entering from the top (arrow) can travel through straight sections 161A and 161B, parallel to the surface of workpiece 162. Manually operated clamps 163 secure workpiece 162 against backing plate 26. In this example, workpiece 162 comprises two polymer sheets with a layer of adhesive between them (shown as a dark layer).

FIG. 17 shows a cross sectional view of the system in FIG. 16. Here it can be seen that a series of slots 171 are formed in the lower surface of the waveguide, so that microwave power propagating parallel to the workpiece can leak out at the selected points. Pockets 27 are formed in backing plate 26 and positioned to correspond with slots 171, so that in this example six spots in the adhesive layer may be cured simultaneously.

For simplicity, the applicator in FIGS. 16-17 is shown in contact with workpiece 162; however, it will be appreciated that a standoff spacing may be established between applicator and workpiece as described in some of the foregoing examples. It will further be appreciated that slots 171 may be the same size and equally spaced apart, as shown, or they may be of different sizes and/or spaced apart at varying intervals in order to achieve various objectives, such as balancing the amount of power delivered to different spots on workpiece 162.

EXAMPLE

In the foregoing example, the launch structure comprises a series of openings in a generally straight slotted waveguide. It will be appreciated that the waveguide may be of other shapes, for example, to conform to the outline of an automobile door frame onto which a flexible seal strip is to be attached. The waveguide may be rigid or it may be flexible so that it can be adapted to variously shaped components, or it may have a combination of rigid and flexible segments. Flexible waveguides are well known in the art [see, e.g., seamless flexible waveguides in various sizes and frequency ranges available from Fairview Microwave, Lewisville, Tex.].

In the foregoing examples, it was contemplated that the waveguide opening is generally centered opposite the pocket and held stationary while applying microwave energy. However, Applicants have further discovered that in some cases further benefits can be obtained by moving the applicator from side to side about the center of the pocket feature while the microwave power is applied, as described in the following example.

EXAMPLE

An open waveguide applicator was used to spot cure an adhesive bead, and the robot arm was used to scan or dither the waveguide from side to side relative to the center of the pocket. The scanning or dithering back and forth was also coordinated with different microwave power outputs. In one instance, the first pass was done in 1 second at 100% power, then the waveguide was moved in the opposite direction in 1 second at 60% power.

A series of tests were conducted in which scan rate, microwave power level, and adhesive bead thickness were varied, as applicants have found that these three factors seem to be the most important control variables. One surprising finding was that a faster scan rate actually produced a higher extent of cure in the adhesive, so scan rate does appear to be important, although the theoretical mechanisms involved remain speculative.

We claim:

1. A microwave heating system comprising:
   a waveguide capable of transmitting microwave energy in a traveling wave mode, with an input side to receive microwave power from a selected source having a usable bandwidth of at least ±1% about a selected center frequency and an output side terminating in a launch structure; and,
   a metallic reflector plate facing said launch structure, parallel thereto and spaced therefrom at a distance of no more than twice the microwave wavelength over the operative frequency range of said source, said reflector plate including a recessed area of a selected size and shape located facing said launch structure so that a material to be heated is placed between said launch structure and said recessed area for exposure to said microwave energy, wherein said selected size and shape of said recessed area is smaller in at least one dimension than said microwave wavelength.

2. The system of claim 1 wherein said launch structure is selected from the group consisting of: open waveguides, flanged waveguides, slotted waveguides, flexible waveguides, and gain horns.

3. The system of claim 1 wherein said launch structure comprises a separate, forward-facing projecting member to engage the surface of said material to be heated and thereby maintain a selected standoff distance between said launch structure and said material to be heated.

4. The system of claim 1 wherein said reflector plate is held in a fixture, and said fixture comprises a device providing a compressive force on said material to be heated during exposure to said microwave energy.

5. The system of claim 4 wherein said fixture includes at least one mechanical feature that engages said reflector plate to fix said reflector plate's orientation with respect to said launch structure.

6. The system of claim 1 wherein said material to be heated comprises a composite material with an adhesive bond.

7. The system of claim 6 wherein said adhesive bond comprises a layer of thermosetting resin.

8. The system of claim 7 wherein said thermosetting resin is selected from the group consisting of: epoxies, phenolics, polyesters, silicones, vulcanized rubbers, methacrylates, and methyl methacrylates.

9. The system of claim 7 wherein said thermosetting resin has a nominal cure temperature of about 20 to 220° C.

10. The system of claim 1 wherein said material to be heated comprises at least one material selected from the group consisting of: metal-to-metal, metal-to-polymer, and polymer-to-polymer adhesive bonds; fiberglass- and carbon-reinforced polymer-matrix composites; thermosetting resins; and thermoplastics.

11. A microwave heating system comprising:
    a variable-frequency microwave source having a usable bandwidth of at least ±1% about a center frequency;
    a waveguide capable of transmitting microwave energy in a traveling wave mode with an input side connected to said source and an output side terminating in a launch structure; and, a metallic reflector plate facing said launch structure, parallel thereto and spaced therefrom at a distance of no more than twice the microwave wavelength over the operative frequency range of said source, said reflector plate including a recessed area of a selected size and shape located facing said launch structure so that a material to be heated is placed between said launch structure and said recessed area for exposure to said microwave energy, wherein said selected size and shape of said recessed area is smaller in at least one dimension than said microwave wavelength.

12. The system of claim 11 wherein said launch structure is selected from the group consisting of: open waveguides, flanged waveguides, slotted waveguides, flexible waveguides, and gain horns.

13. The system of claim 11 wherein said launch structure comprises a separate, forward-facing projecting member to engage the surface of said material to be heated and thereby maintain a selected standoff distance between said launch structure and said material to be heated.

14. The system of claim 11 wherein said reflector plate is held in a fixture, and said fixture comprises a device providing a compressive force on said material to be heated during exposure to said microwave energy.

15. The system of claim 14 wherein said fixture includes at least one mechanical feature that engages said reflector plate to fix said reflector plate's orientation with respect to said launch structure.

16. The system of claim 11 wherein said material to be heated comprises a composite material with an adhesive bond.

17. The system of claim 16 wherein said adhesive bond comprises a layer of thermosetting resin.

18. The system of claim 17 wherein said thermosetting resin is selected from the group consisting of: epoxies, phenolics, polyesters, silicones, vulcanized rubbers, methacrylates, and methyl methacrylates.

19. The system of claim 17 wherein said thermosetting resin has a nominal cure temperature of about 20 to 220° C.

20. The system of claim 11 wherein said material to be heated comprises at least one material selected from the group consisting of: metal-to-metal, metal-to-polymer, and polymer-to-polymer adhesive bonds; fiberglass- and carbon-reinforced polymer-matrix composites; thermosetting resins; and thermoplastics.

* * * * *